(12) United States Patent
Zhang et al.

(10) Patent No.: US 11,296,924 B2
(45) Date of Patent: Apr. 5, 2022

(54) COMMUNICATION METHOD, COMMUNICATIONS DEVICE, AND STORAGE MEDIUM

(71) Applicant: Huawei Technologies Co., Ltd., Shenzhen (CN)

(72) Inventors: Xiaojun Zhang, Shenzhen (CN); Qichang Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/784,741

(22) Filed: Feb. 7, 2020

(65) Prior Publication Data

US 2020/0177442 A1    Jun. 4, 2020

Related U.S. Application Data

(63) Continuation of application No. PCT/CN2018/092947, filed on Jun. 26, 2018.

(30) Foreign Application Priority Data

Aug. 9, 2017   (CN) .......................... 201710677029.7

(51) Int. Cl.
*H04L 12/24* (2006.01)
*H04L 29/06* (2006.01)
(Continued)

(52) U.S. Cl.
CPC ...... *H04L 41/0686* (2013.01); *H04L 41/0681* (2013.01); *H04L 69/18* (2013.01)

(58) Field of Classification Search
None
See application file for complete search history.

(56) References Cited

U.S. PATENT DOCUMENTS

| 7,213,178 | B1 | 5/2007 | Prasad et al. |
| 2008/0285466 | A1* | 11/2008 | Salam ................... H04L 45/50 370/241.1 |

(Continued)

FOREIGN PATENT DOCUMENTS

| CN | 101351056 A | 1/2009 |
| CN | 106612220 A | 5/2017 |

(Continued)

OTHER PUBLICATIONS

Huawei, "Introduction to Flexible Ethernet and its application in IP/MPLS network," Telecommunication Standardization Sector, Study Period 2013-2016, Focus Group on IMT-2020, IMT-I-230 Rev. 3, Geneva, Dec. 5-9, 2016, 11 pages.

(Continued)

*Primary Examiner* — Kenny S Lin
(74) *Attorney, Agent, or Firm* — Slater Matsil, LLP

(57) ABSTRACT

A communication method is provided. In embodiments of this application, first fault information is obtained by using a first port, and second fault information is sent based on the first fault information by using a second port. The first port is a first-type port, the first-type port transmits information according to a standard Ethernet protocol, the first fault information is first-type fault information, the second port is a second-type port, the second-type port transmits information according to a flexible Ethernet protocol, the first-type fault information includes at least one of local fault information and remote fault information, the second fault information is second-type fault information, and the second-type fault information is used to indicate that a link corresponding to the standard Ethernet protocol is faulty.

20 Claims, 13 Drawing Sheets

(51) Int. Cl.
*H04L 41/0686* (2022.01)
*H04L 41/0681* (2022.01)
*H04L 69/18* (2022.01)

(56) References Cited

U.S. PATENT DOCUMENTS

| | | | | |
|---|---|---|---|---|
| 2012/0134664 | A1* | 5/2012 | Zheng | H04L 45/22 398/5 |
| 2013/0182559 | A1* | 7/2013 | Fujioka | H04L 41/0668 370/218 |
| 2014/0133289 | A1* | 5/2014 | Jadav | H04L 41/0672 370/216 |
| 2015/0088432 | A1 | 3/2015 | Sanborn et al. | |
| 2017/0005901 | A1 | 1/2017 | Gareau | |
| 2017/0005949 | A1 | 1/2017 | Gareau | |
| 2017/0223436 | A1 | 8/2017 | Moynihan et al. | |
| 2019/0372717 | A1 | 12/2019 | Zhang et al. | |

FOREIGN PATENT DOCUMENTS

| | | |
|---|---|---|
| CN | 106911426 A | 6/2017 |
| CN | 106982105 A | 7/2017 |
| JP | 2004320683 | 11/2004 |
| JP | 2008219382 | 9/2008 |
| JP | 2012147178 A | 8/2012 |

OTHER PUBLICATIONS

Oif, "FlexE Implementation Agreement—Draft 1.3," IA OIF-FLEXE-01.0, Jan. 2016, pp. 1-32.

IEEE Std 802.3-2015, IEEE Standard for Ethernet, IEEE Computer Society, Sponsored by the LAN/MAN Standards Committee, Approved Sep. 3, 2015, 4017 pages.

Flex Ethernet, Implementation Agreement, IA# OIF-FLEXE-01.0, Mar. 2016. 31 pages.

Trowbridge, S.J. et al., "Flex Ethernet Implementation Agreement 1.0", IA # OIF-FLEXE-01. 0, OIF Optical Internetworking Forum, Mar. 2016, 31pages.

Kuwabara, S. et al., "A Study of Reliability Enhancement of Logical MAC Links for Large Capacity Bandwidth-variable Interface", The Institute of Electronics, Information and Communication Engineers Technical Report, The Institute of Electronics, Information and Communication Engineers, Jan. 12, 2017, vol. 116, No. 402, OCS2016-69, pp. 27-30.

* cited by examiner

| Control block formats (control block formats) | Synchronization header (sync) | Block type field (block type field) | | | | |
|---|---|---|---|---|---|---|
| $O_0D_1D_2D_3Z_4Z_5Z_6Z_7$ | 10 | 0x4B | $D_1$ | $D_2$ | $D_3$ | $O_0$ | 0x0000000 |

FIG. 10

| Synchronization header | Block type field | $D_1$ | $D_2$ | $D_3$ | $O_0$ | |
|---|---|---|---|---|---|---|
| 1 | 0 | 0x4B | 0b00000101 | 0b00000000 | 0x06 | 0x0 | 0x0000000 |

FIG. 11

| Synchronization header | Block type field | $D_1$ | $D_2$ | $D_3$ | $O_0$ | |
|---|---|---|---|---|---|---|
| 1 | 0 | 0x4B | 0x00 | 0x00 | 0x01 | 0x0 | 0x0000000 |

FIG. 12

| Synchronization header | Block type field | $D_1$ | $D_2$ | $D_3$ | $O_0$ | |
|---|---|---|---|---|---|---|
| 1 | 0 | 0x4B | 0x00 | 0x00 | 0x02 | 0x0 | 0x0000000 |

FIG. 13

| Synchronization header | Block type field | D₁ | D₂ | D₃ | O₀ | |
|---|---|---|---|---|---|---|
| 1 | 0 | 0x4B | Bit 0 to bit 5 of the D1 byte | Bit 6 and bit 7 of the D1 byte | Bit 0 and bit 1 of the D2 byte | 0x06 | 0x6 | 0x0000000 |
| | | | 0b00000001 | 1110 indicates client-service-type remote fault information RCSF; 1111 indicates client-service-type local fault information CSF; 0100 indicates an Ethernet service (Ethernet service). | | | |

FIG. 14

| Synchronization header | Block type field | D₁ | D₂ | D₃ | O₀ | |
|---|---|---|---|---|---|---|
| 1 | 0 | 0x4B | 0b00000111 | 0b11000000 | 0x06 | 0x6 | 0x0000000 |

FIG. 15

| Synchronization header | Block type field | D₁ | D₂ | D₃ | O₀ | |
|---|---|---|---|---|---|---|
| 1 | 0 | 0x4B | 0b00000111 | 0b10000000 | 0x06 | 0x6 | 0x0000000 |

FIG. 16

COMMUNICATION METHOD, COMMUNICATIONS DEVICE, AND STORAGE MEDIUM

CROSS-REFERENCE TO RELATED APPLICATIONS

This application is a continuation of International Application No. PCT/CN2018/092947, filed on Jun. 26, 2018, which claims priority to Chinese Patent Application No. 201710677029.7, filed on Aug. 9, 2107. The disclosures of the aforementioned applications are hereby incorporated by reference in their entireties.

TECHNICAL FIELD

This application relates to the communications field, and in particular, to a communication method, a communications device, and a storage medium.

BACKGROUND

The 802.3 standard Ethernet (StdE) related standards defined by the 802.3 working group of the Institute of Electrical and Electronics Engineers (IEEE) are widely used in the industry. A standard Ethernet is greatly welcomed by manufacturers because of its simple principle, easy implementation, and low price. However, with development of technologies, a difference between bandwidth granularities is getting larger, and a port of the standard Ethernet increasingly deviates from an actual application requirement. It is likely that mainstream required application bandwidth does not belong to any existing standard Ethernet rate. For example, resource waste is caused if a 100 GE port is used to carry a 50 Gb/s service, and there is no corresponding Ethernet standard granularity to carry a 200 Gb/s service.

To meet this challenge, the Optical Internet Forum (OIF) releases a flexible Ethernet (FlexE). The FlexE is a general-purpose technology that supports a plurality of Ethernet MAC layer rates. By binding a plurality of 100 GE (Physical, PHYs) ports and dividing each 100 GE port into 20 timeslots in a granularity of 5G in time domain, the FlexE can support the following functions: binding: binding a plurality of Ethernet ports together as a link group to support a Medium Access Control (MAC) service whose rate is greater than bandwidth of a single Ethernet port; a sub-rate: allocating a timeslot to a service to support a MAC service whose rate is less than bandwidth of a link group or bandwidth of a single Ethernet port; channelization: allocating timeslots to services to support simultaneous transmission of a plurality of MAC services in a link group, for example, supporting simultaneous transmission of one 150 G MAC service and two 25 G MAC services in a 2×100 GE link group.

FIG. 1 is a schematic diagram of a possible communications system architecture in the prior art. As shown in FIG. 1, the architecture includes a first Ethernet device 1101 and a second Ethernet device 1201. The first Ethernet device 1101 includes a medium dependent interface (MDI) 1102 (which is marked as MEDIUM 1102 in the figure for clear description), a physical layer, a medium independent interface (MII) 1107, a reconciliation sublayer (Reconciliation Sublayer, RS) 1108, a Medium Access Control (MAC) layer 1109, and an upper layer (Upper layer) 1110. The physical layer of the first Ethernet device 1101 may include a physical medium dependent sublayer (PMD) 1104, a physical medium attachment sublayer (PMA) 1105, and a physical coding sublayer (PCS) 1106. The upper layer 1110 may include an Internet Protocol (IP) layer, a Transmission Control Protocol (TCP) layer, and the like. Correspondingly, the second Ethernet device 1201 includes a medium dependent interface (MDI) 1202 (which is marked as MEDIUM 1202 in the figure for clear description), a physical layer, an MII 1207, an RS 1208, a MAC layer 1209, and an upper layer 1210. The physical layer of the second Ethernet device 1201 may include a PMD 1204, a PMA 1205, and a PCS 1206. The upper layer 1210 may include an IP layer, a TCP layer, and the like.

Clause 81.3.4 of the IEEE 802.3 standard document defines local fault information (Local Fault, LF) and remote fault information (Remote Fault) in a 40 GE/100 GE standard Ethernet protocol. The local fault information may indicate a fault detected between a remote RS and a local RS. The remote fault information may be RF generated by the RS when the RS detects the LF. The protocol specifies a mechanism for link fault status negotiation between the local RS sublayer and the remote RS sublayer, and an LF-and-RF-based mechanism for sending and processing a 64b/66-bit block.

As shown in FIG. 1, a link for sending information from the second Ethernet device 1201 to the first Ethernet device 1101 is faulty, and the physical layer (for example, the PMD 1104) of the first Ethernet device 1101 detects the link fault. The PMD 1104, the PMA 1105, or the PCS 1106 generates LF and sends the LF to an upper-layer functional unit until the RS 1108 receives the LF. If the RS 1108 detects the LF that is sent by the PCS 1106 by using the MII interface 1107, the RS 1108 stops delivering a data flow from the upper MAC layer to the PCS 1106, and continuously delivers RF destined for the second Ethernet device 1201 to the PCS 1106. If a transmission link from the first Ethernet device 1101 to the second Ethernet device 1201 is normal, the RF can arrive at the second Ethernet device 1201.

The RS 1208 of the second Ethernet device 1201 detects the RF, stops delivering a data flow from the upper MAC layer to the PCS 1206, and continuously delivers an idle control block flow (refer to Clause 81.3.4 of IEEE 802.3-2015 Section 6) to the PCS 1206. The idle control block flow is sent from the second Ethernet device 1201 to the first Ethernet device 1101. Because the transmission link from the second Ethernet device 1201 to the first Ethernet device 1101 is faulty, the idle control block flow does not arrive at the first Ethernet device 1101.

It can be learned from the above example that in the prior art, fault negotiation can be implemented by transmitting LF and RF in an Ethernet device, and an RS of the Ethernet device can terminate fault information and stop transmission of a data flow from a MAC layer. Based on the provided flexible Ethernet protocol, it is imperative to combine the standard Ethernet protocol and the flexible Ethernet protocol in networking. However, no fault information transmission scheme is currently available for joint networking in which the standard Ethernet protocol and the flexible Ethernet protocol are used.

In conclusion, a communication solution is urgently required to implement fault information transmission in joint networking in which the standard Ethernet protocol and the flexible Ethernet protocol are used.

SUMMARY

Embodiments of this application provide a communication method, a communications device, and a storage medium, to transmit fault information in joint networking in which a standard Ethernet protocol and a flexible Ethernet protocol are used.

According to a first aspect, an embodiment of this application provides a communication method, where the method includes: obtaining first fault information by using a first port, where the first port is a first-type port, the first-type port transmits information according to a standard Ethernet protocol, the first fault information is first-type fault information, and the first-type fault information includes at least one of local fault information and remote fault information; and sending second fault information based on the first fault information by using a second port, where the second port is a second-type port, the second-type port transmits information according to a flexible Ethernet protocol, the second fault information is second-type fault information, and the second-type fault information is used to indicate that a link corresponding to the standard Ethernet protocol is faulty.

In this embodiment of this application, the first fault information is obtained by using the first port, and the second fault information is sent based on the first fault information by using the second port. The first port is a first-type port, the first-type port transmits information according to the standard Ethernet protocol, the first fault information is first-type fault information, the second port is a second-type port, and the second-type port transmits information according to the flexible Ethernet protocol. The first-type fault information includes at least one of the local fault information and the remote fault information, the second fault information is second-type fault information, and the second-type fault information is used to indicate that the link corresponding to the standard Ethernet protocol is faulty. Therefore, through transmission of the second fault information, not only a fault can be reported in joint networking in which the standard Ethernet protocol and the flexible Ethernet protocol are used, but also a foundation can be laid for determining whether a link corresponding to the flexible Ethernet protocol or the link corresponding to the standard Ethernet protocol is faulty.

In a possible design, the sending second fault information based on the first fault information by using a second port includes: if the obtained first-type fault information meets a first preset condition, sending the second fault information based on the first fault information by using the second port, where the first preset condition includes: a quantity of first-type fault information obtained within first preset duration is greater than a first quantity threshold; or a quantity of obtained first preset code blocks is not less than the first quantity threshold, and an interval between any two obtained adjacent first preset code blocks does not exceed a first-preset-code-block interval. This can avoid a misoperation caused by a relatively small quantity of fault information and further improve operation accuracy.

In a possible design, the method further includes: obtaining third fault information by using the second port, where the third fault information is second-type fault information; and sending fourth fault information based on the third fault information by using the first port, where the fourth fault information is first-type fault information. In this way, the second-type fault information may be transmitted inside a flexible Ethernet network, and the first-type fault information may be transmitted outside the flexible Ethernet network, so that whether a link corresponding to the flexible Ethernet protocol or the link corresponding to the standard Ethernet protocol is faulty can be determined based on a type of fault information.

In a possible design, the sending fourth fault information based on the third fault information by using the first port includes: if the obtained second-type fault information meets a second preset condition, sending the fourth fault information based on the third fault information by using the first port, where the second preset condition includes: a quantity of third fault information obtained within second preset duration is greater than a second quantity threshold; or a quantity of obtained second preset code blocks is not less than the second quantity threshold, and an interval between any two obtained adjacent second preset code blocks does not exceed a second-preset-code-block interval. This can avoid a misoperation caused by a relatively small quantity of fault information and further improve operation accuracy.

In a possible design, the method further includes: obtaining fifth fault information by using a third port, where the third port is a second-type port, and the fifth fault information is first-type fault information or second-type fault information; and sending the fifth fault information by using a fourth port, where the fourth port is a second-type port. In this way, the first-type fault information and the second-type fault information may be transparently transmitted inside a flexible Ethernet network, and further, the second-type fault information may be transmitted inside the flexible Ethernet network, and the first-type fault information may be transmitted outside the flexible Ethernet network, so that whether a link corresponding to the flexible Ethernet protocol or the link corresponding to the standard Ethernet protocol is faulty can be determined based on a type of fault information.

In a possible design, the method further includes: obtaining sixth fault information by using a fifth port, where the fifth port is a second-type port, the sixth fault information is first-type fault information, and a standby link is configured for the fifth port; and enabling the standby link corresponding to the fifth port. It can be learned that in this embodiment of this application, whether a link corresponding to the flexible Ethernet protocol or the link corresponding to the standard Ethernet protocol is faulty can be determined based on the first-type fault information and the second-type fault information. This prevents a protection switching function from being triggered when the link corresponding to the standard Ethernet protocol is faulty, and can more accurately trigger the protection switching function based on fault information on a flexible Ethernet protocol network.

In a possible design, the sending second fault information based on the first fault information by using a second port includes: sending at least two pieces of second fault information based on the first fault information by using the second port, where any two of the at least two pieces of second fault information are separated by at least one code block. In this way, sending frequency of the second fault information can be flexibly set. For example, if the sending frequency of the second fault information is set to be smaller than sending frequency of the first fault information, used transmission path bandwidth of a link corresponding to the flexible Ethernet protocol can be reduced. For example, the first fault information is the remote fault information, and the second fault information is client-service-type remote fault information. The remote fault information is continuously sent, and relatively large bandwidth is occupied. If a piece of client-service-type remote fault information is sent at intervals of a specific quantity of code blocks, occupied bandwidth can be reduced.

According to a second aspect, an embodiment of this application provides a communication method, where the method includes: obtaining third fault information by using a second port, and sending fourth fault information based on the third fault information by using a first port, where the first port is a first-type port, the first-type port transmits information according to a standard Ethernet protocol, the fourth fault information is first-type fault information, the first-type fault information includes at least one of local fault information and remote fault information, the second port is a second-type port, the second-type port transmits information according to a flexible Ethernet protocol, the third fault information is second-type fault information, and the second-type fault information is used to indicate that a link corresponding to the standard Ethernet protocol is faulty.

In this embodiment of this application, the third fault information is obtained by using the second port, and the fourth fault information is sent based on the third fault information by using the first port. The first-type fault information includes at least one of the local fault information and the remote fault information, and the second-type fault information is used to indicate that the link corresponding to the standard Ethernet protocol is faulty. Therefore, through transmission of the second fault information, first, a fault can be reported in joint networking in which the standard Ethernet protocol and the flexible Ethernet protocol are used, second, a foundation can be laid for determining whether a link corresponding to the flexible Ethernet protocol or the link corresponding to the standard Ethernet protocol is faulty, and third, a solution of reporting a fault on a standard Ethernet protocol network by using the first-type fault information can also be supported.

The communication method further includes the method in any one of the first aspect and the possible designs of the first aspect. Details are not described herein again.

According to a third aspect, an embodiment of this application provides a communications device, where the communications device includes a memory, a transceiver, and a processor, the memory is configured to store an instruction, the processor is configured to execute the instruction stored in the memory, and control the transceiver to send and receive signals, and when the processor executes the instruction stored in the memory, the communications device is configured to perform the method in any one of the first aspect and the possible designs of the first aspect.

According to a fourth aspect, an embodiment of this application provides a communications device configured to implement the method in any one of the first aspect and the possible designs of the first aspect, where the communications device includes corresponding functional modules separately configured to implement the steps of the foregoing method.

According to a fifth aspect, an embodiment of this application provides a computer storage medium, where the computer storage medium stores an instruction, and when the instruction is executed on a computer, the computer performs the method in any one of the first aspect and the possible implementations of the first aspect.

According to a sixth aspect, an embodiment of this application provides a computer program product including an instruction, where when the computer program product runs on a computer, the computer performs the method in any one of the first aspect and the possible implementations of the first aspect.

BRIEF DESCRIPTION OF THE DRAWINGS

FIG. 10 is a schematic diagram of a 0x4B 66-bit block code block according to an embodiment of this application;

FIG. 11 is a schematic diagram of fault-rectified information based on the 0x4B code block shown in FIG. 10 according to an embodiment of this application;

FIG. 12 is a schematic diagram of local fault information based on the 0x4B code block shown in FIG. 10 according to an embodiment of this application;

FIG. 13 is a schematic diagram of remote fault information based on the 0x4B code block shown in FIG. 10 according to an embodiment of this application;

FIG. 14 is a schematic diagram of second-type fault information based on the 0x4B code block shown in FIG. 10 according to an embodiment of this application;

FIG. 15 is a schematic diagram of client-service-type local fault information based on the 0x4B code block shown in FIG. 10 according to an embodiment of this application;

FIG. 16 is a schematic diagram of client-service-type remote fault information based on the 0x4B code block shown in FIG. 10 according to an embodiment of this application;

DETAILED DESCRIPTION OF ILLUSTRATIVE EMBODIMENTS

Figure 2:
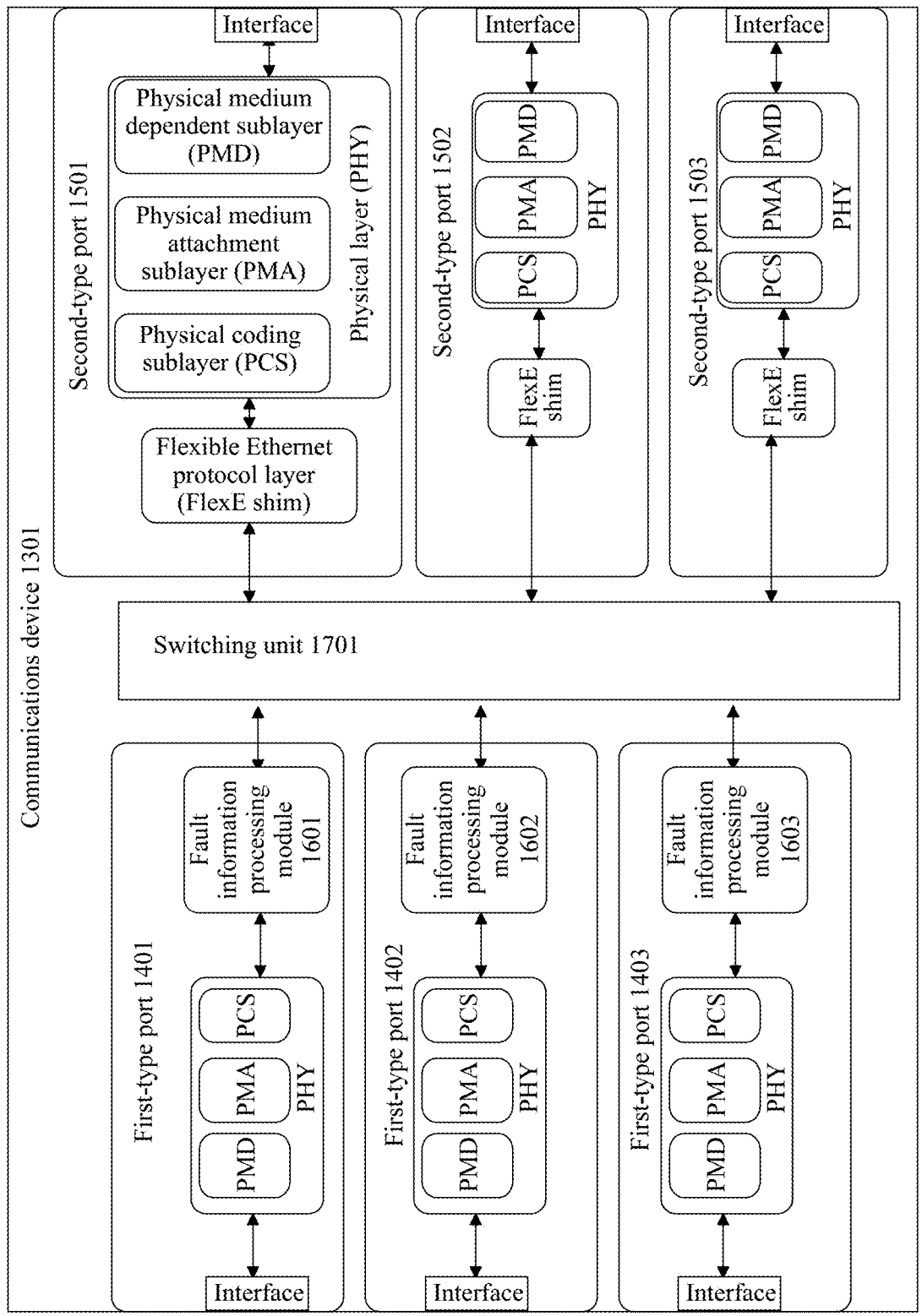
FIG. 2 is a schematic structural diagram of a communications device according to an embodiment of this application.

FIG. 2 is a schematic structural diagram of an example of a communications device according to an embodiment of this application. As shown in FIG. 2, a communications device 1301 includes two types of ports: a first-type port and a second-type port. The first-type port transmits information according to a standard Ethernet protocol, and the second-type port transmits information according to a flexible Ethernet protocol. The communications device 1301 may include one or more first-type ports and one or more second-type ports, for example, a first-type port 1401, a first-type port 1402, a first-type port 1403, and a second-type port 1501, a second-type port 1502, and a second-type port 1503 shown in FIG. 2. The first-type port correspondingly includes an interface and a physical layer, and the physical layer of the first-type port includes a PMD, a PMA, and a PCS. The second-type port includes an interface, a physical layer, and a flexible Ethernet protocol layer (also referred to as FlexE shim in English), and the physical layer of the second-type port includes a PMD, a PMA, and a PCS. The interfaces of the first-type port and the second-type port are specifically connection ports of a cable. Optionally, the first-type port further includes another layer above the physical layer, for example, a MAC layer. The first-type port in this embodiment of this application does not include an RS. Optionally, the second-type port further includes another layer above the flexible Ethernet protocol layer, for example, a MAC layer. FIG. 2 schematically illustrates only the physical layer of the first-type port, the physical layer and the flexible Ethernet protocol layer of the second-type port, and the like.

The first-type port in this embodiment of this application may be a port that supports only the standard Ethernet protocol. In this case, the first-type port can transmit information only according to the standard Ethernet protocol. Optionally, the first-type port may be a port that supports both the standard Ethernet protocol and the flexible Ethernet protocol. In this case, the first-type port is a port whose currently used protocol is the standard Ethernet protocol. The second-type port in this embodiment of this application may be a port that supports only the flexible Ethernet protocol. In this case, the second-type port can transmit information only according to the flexible Ethernet protocol. Optionally, the second-type port may be a port that supports both the standard Ethernet protocol and the flexible Ethernet protocol. In this case, the second-type port is a port whose currently used protocol is the flexible Ethernet protocol. For example, the first port can support the standard Ethernet protocol and the flexible Ethernet protocol. If the first port transmits information according to the standard Ethernet protocol in a time period, the first port may be referred to as the first-type port in the time period in which the information is transmitted according to the standard Ethernet protocol; if the first port transmits information according to the flexible Ethernet protocol in a time period, the first port may be referred to as the second-type port in the time period in which the information is transmitted according to the flexible Ethernet protocol.

Figure 1:
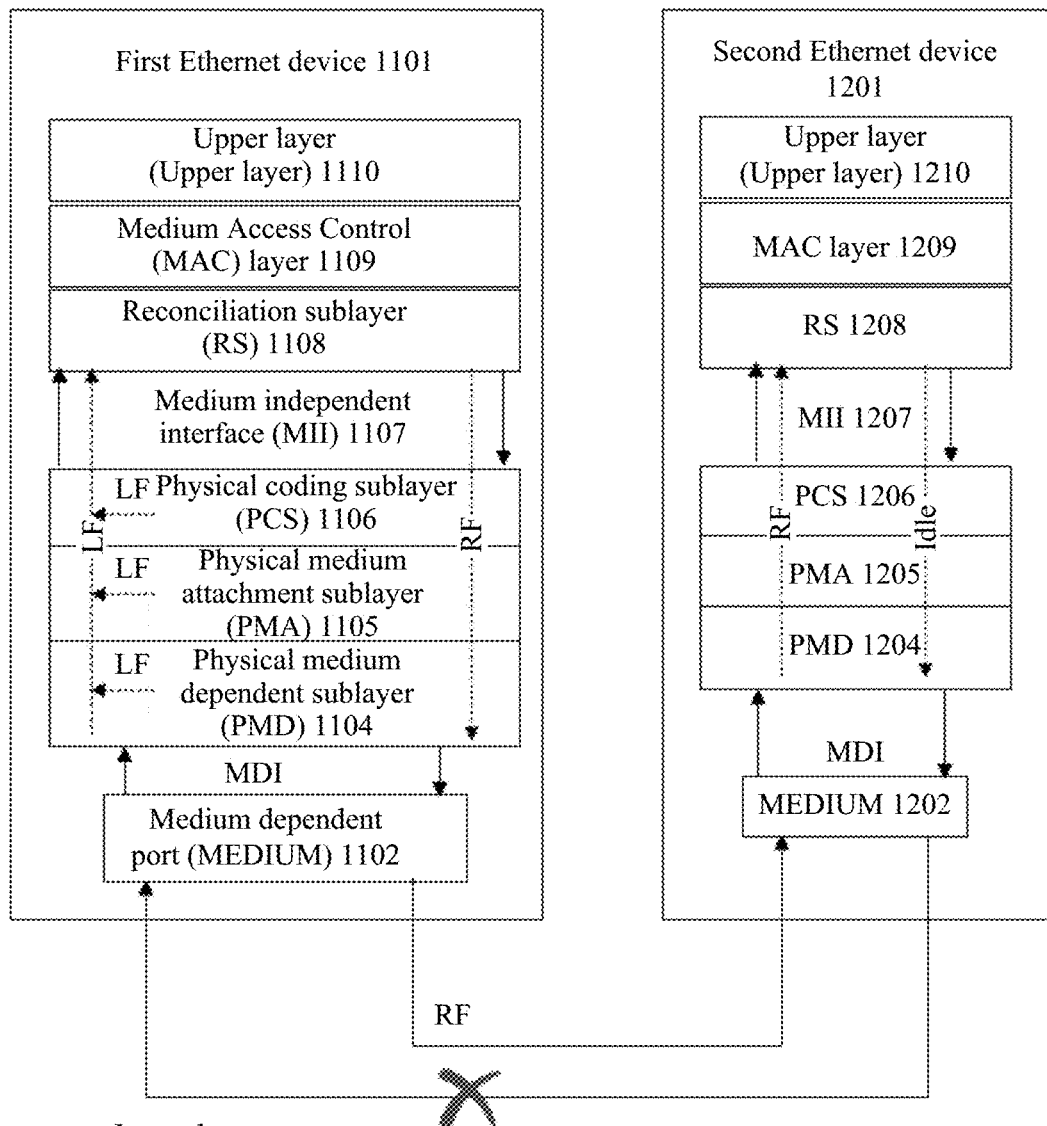
FIG. 1 is a schematic diagram of a possible communications system architecture in the prior art.

Optionally, in this embodiment of this application, a third-type port may be further included. The third-type port transmits information according to the standard Ethernet protocol, and sequentially includes an interface, a physical layer, an RS, and another upper-layer functional unit such as a MAC layer. For example, the third-type port may be a port, including an RS, of the first Ethernet device 1101 or the second Ethernet device 1201 shown in FIG. 1. Optionally, the third-type port may be a port that supports only the standard Ethernet protocol. In this case, the third-type port can transmit information only according to the standard Ethernet protocol. Optionally, the third-type port may be a port that supports both the standard Ethernet protocol and the flexible Ethernet protocol. In this case, the third-type port is a port whose currently used protocol is the standard Ethernet protocol.

As shown in FIG. 2, the communications device 1301 in this embodiment of this application further includes a fault information processing module. There may be one or more fault information processing modules, such as a fault information module 1601, a fault information module 1602, and a fault information module 1603 in FIG. 2. In an optional implementation, the fault information processing module may be disposed on the first-type port side, for example, at an upper layer of the physical layer of the first-type port; or may be disposed on the second-type port side, for example, at an upper layer of the physical layer of the second-type port. In an optional implementation, the fault information module may be disposed on a link connecting the first-type port and the second-type port. The fault information processing module in this embodiment of this application may perform the solution provided in this embodiment of this application, for example, may generate second-type fault information based on first-type fault information, or may generate first-type fault information based on second-type fault information.

As shown in FIG. 2, optionally, a switching unit 1701 is further included in this embodiment of this application, and the ports may be connected by using the switching unit 1701. The switching unit 1701 may also be referred to as a layer 1.5 flexible Ethernet protocol switching unit in a communications device 2102, a communications device 2103, and a communications device 2104. Layer 1.5 may be a data transport layer used in the flexible Ethernet protocol, and may be a data transport layer between a physical layer and a MAC layer of a 7-layer Open System Interconnection (OSI) model. Concepts such as a layer above a physical layer or an upper layer of a physical layer in this embodiment of this application all mean a layer above the physical layer in the model, for example, layer 1.5 in the flexible Ethernet protocol, namely, a flexible Ethernet protocol layer, or a MAC layer. An association relationship between the ports may be pre-configured. For example, in FIG. 2, an association relationship may be set between the first-type port 1401 and the second-type port 1501. In other words, the first-type port 1401 is connected to the second-type port 1501, information obtained by the first-type port 1401 (the information is to-be-sent information by default, and the obtained information may be information received from another device or information generated by the first-type port 1401) all needs to be sent by using the second-type port 1501, and information obtained by the second-type port 1501 (the information is to-be-sent information by default, and the obtained information may be information received from another device or information generated by the second-type port 1501) all needs to be sent by using the first-type port 1401.

Optionally, one port may be connected to one or more ports, but some connection relationships may not be in a working state. For example, in FIG. 2, the first-type port 1401 is connected to the second-type port 1501, and the first-type port 1401 is also connected to the second-type port 1502. However, a connection between the first-type port 1401 and the second-type port 1502 is not in a working state currently, and only a connection between the first-type port 1401 and the second-type port 1501 is in a working state currently. In this case, information obtained by the first-type port 1401 all needs to be sent by using the second-type port 1501, and information obtained by the second-type port 1501 all needs to be sent by using the first-type port 1401. In this case, it may be considered that there is an association relationship between the first-type port 1401 and the second-type port 1501. The connection between the first-type port 1401 and the second-type port 1502 is in an inactive state, and it may be considered that an association is in an inactive state or is not activated, or the like. In other words, the association relationship between ports in this embodiment of this application is an association relationship in a working state. If the connection between the first-type port 1401 and the second-type port 1502 is also in a working state in a next time period, information obtained by the first-type port 1401 all needs to be sent by using the second-type port 1502, and information obtained by the second-type port 1502 all needs to be sent by using the first-type port 1401. It may be considered that there is an association relationship between the first-type port 1401 and the second-type port 1502 in the next time period. An association relationship between two ports in the following embodiments of this application may mean that there is a connection between the two ports and the connection is in a working state, as described in this example.

Figure 3:
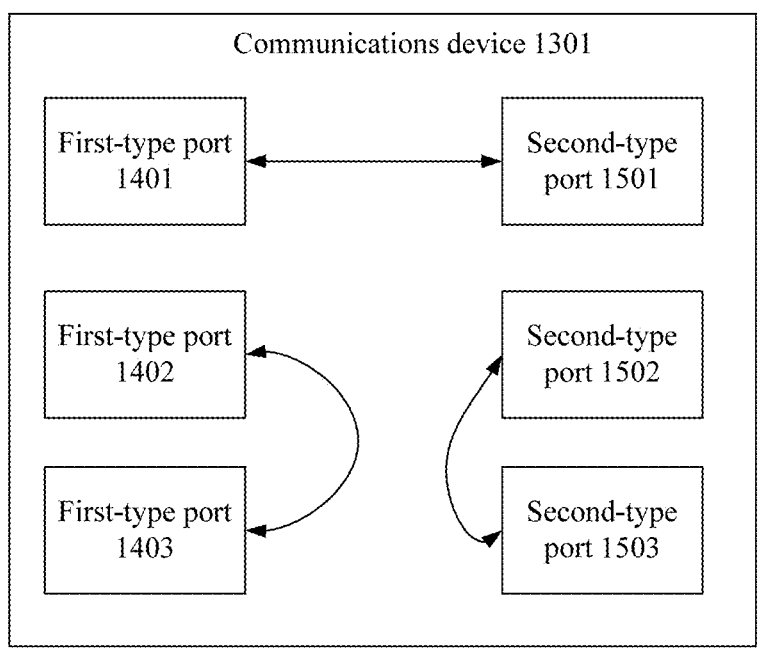
FIG. 3 is a schematic structural diagram of a communications device according to an embodiment of this application.

The communications device in this embodiment of this application may include at least two first-type ports, or may include at least two second-type ports, or may include at least one first-type port and at least one second-type port. In this embodiment of this application, a third-type port may also be included. FIG. 3 is a schematic structural diagram of an example of a communications device according to an embodiment of this application. As shown in FIG. 3, if the communications device in this embodiment of this application includes two types of ports (a first-type port and a second-type port), there may be an association relationship between the first-type port and the second-type port, or there may be an association relationship between ports of a same type (for example, two first-type ports or two second-type ports). For example, there is an association relationship between the first-type port 1401 and the second-type port 1501, there is an association relationship between the first-type port 1402 and the first-type port 1403, and there is an association relationship between the second-type port 1502 and the second-type port 1503 in FIG. 3.

Figure 4:
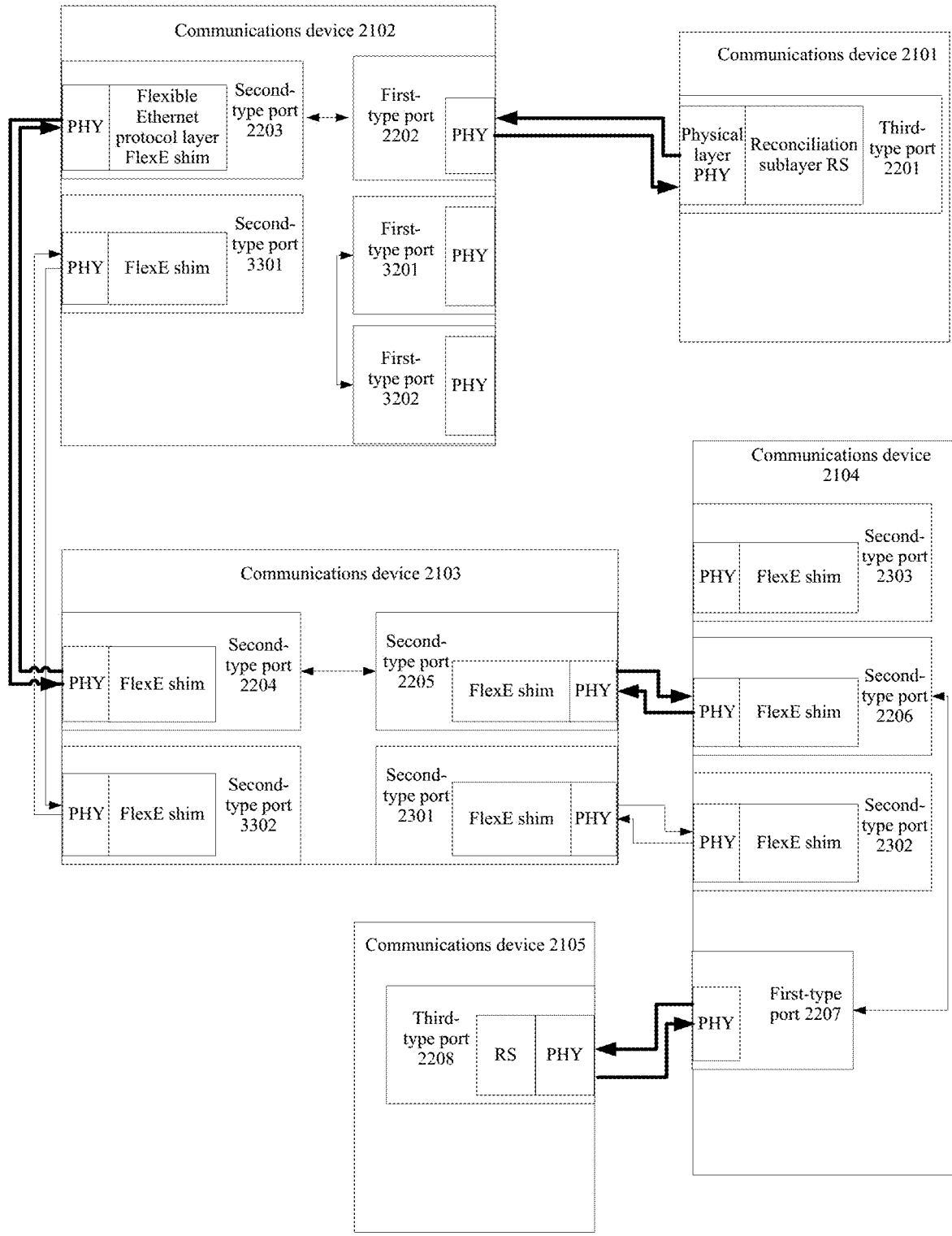
FIG. 4 is a schematic diagram of a system architecture according to an embodiment of this application.

FIG. 4 is a schematic diagram of an example of a system architecture according to an embodiment of this application. As shown in FIG. 4, the communications system includes a communications device 2101, a communications device 2102, a communications device 2103, a communications device 2104, and a communications device 2105 that are sequentially connected. A third-type port 2201 of the communications device 2101 is connected to a first-type port 2202 of the communications device 2102, and there is an association relationship between the first-type port 2202 and a second-type port 2203 inside the communications device 2102. The second-type port 2203 of the communications device 2102 is connected to a second-type port 2204 of the communications device 2103, and there is an association relationship between the second-type port 2204 and a second-type port 2205 inside the communications device 2103. The second-type port 2205 of the communications device 2103 is connected to a second-type port 2206 of the communications device 2104, and there is an association relationship between the second-type port 2206 and a first-type port 2207 inside the communications device 2104. The first-type port 2207 of the communications device 2104 is connected to a third-type port 2208 of the communications device 2105.

The ports included in each communications device of the system architecture shown in FIG. 4 are merely examples. Any one of the communications device 2101, the communications device 2102, the communications device 2103, the communications device 2104, and the communications device 2105 may include at least one of at least one first-type port, at least one second-type port, and at least one third-type port. This is not limited in this embodiment of this application. For example, the communications device 2101 and the communications device 2105 each may include only a third-type port. In this case, the communications device 2101 and the communications device 2105 may also be referred to as Ethernet devices or user-side devices. Optionally, the communications device 2101 and the communications device 2105 each may further include at least one first-type port and/or at least one second-type port, or the like. The communications device 2103 may include only a second-type port. Optionally, the communications device 2103 may further include at least one first-type port and/or at least one third-type port, or the like. The communications device 2102 and the communications device 2104 each include at least one first-type port and at least one second-type port, so that information to be transmitted by the first-type port may be transmitted by using the second-type port. Optionally, the communications device 2102 may further include at least one third-type port.

Optionally, in the system architecture shown in FIG. 4, the communications device 2102 and the communications device 2104 may be referred to as PE nodes, or provider edges in English, and are network devices connected to a user at an operator network edge. A port between networks or a port between devices on a network (Network to Network interface, NNI) and a user-side port may be configured on the PE node. The user-side port is a port connecting a network and a user (User network interface, UNI). Optionally, the user-side port may be a first-type port, and the port between networks or the port between devices on a network may be a second-type port. The communications device 2103, a provider in English, is a network device on an operator network. The communications device 2103 may be referred to as a P node, and only an NNI network port may be configured on the P node. Optionally, there may be one or more communications devices 2103 between the communications device 2102 and the communications device 2104. In other words, each of the two PE nodes is connected to a P node and an Ethernet device, and there may be at least one P node between the two PE nodes. In this system architecture, information corresponding to a standard Ethernet protocol may be transmitted by using a flexible Ethernet protocol, so that data can be transmitted more quickly and efficiently, and a flexible Ethernet protocol can also be used in a standard Ethernet network architecture.

In this embodiment of this application, as shown in FIG. 4, the third-type ports of the communications device 2101 and the communications device 2105 include an RS. To improve information transmission efficiency, optionally, an RS may not be configured for the first-type ports and the second-type ports of the communications device 2102, the communications device 2103, and the communications device 2104. In this embodiment of this application, data may be transmitted between the ports. Optionally, there may be two types of links between the ports: One type of link is used to send information from one port to another port, and the other type of link is used by the one port to receive information sent by the another port. For example, two types of links may exist between the third-type port 2201 and the first-type port 2202, and may be referred to as a first-type link and a second-type link respectively. The first-type link is used to transmit information that is sent from the third-type port 2201 to the first-type port 2202, and the second-type link is used to transmit information that is sent from the first-type port 2202 to the third-type port 2201. During specific implementation, optionally, the first-type link and the second-type link may be a pair of optical fibers used for receiving and sending, respectively. In other words, one optical fiber in the pair of optical fibers may be referred to as the first-type link, and the other optical fiber may be referred to as the second-type link.

Figure 5:
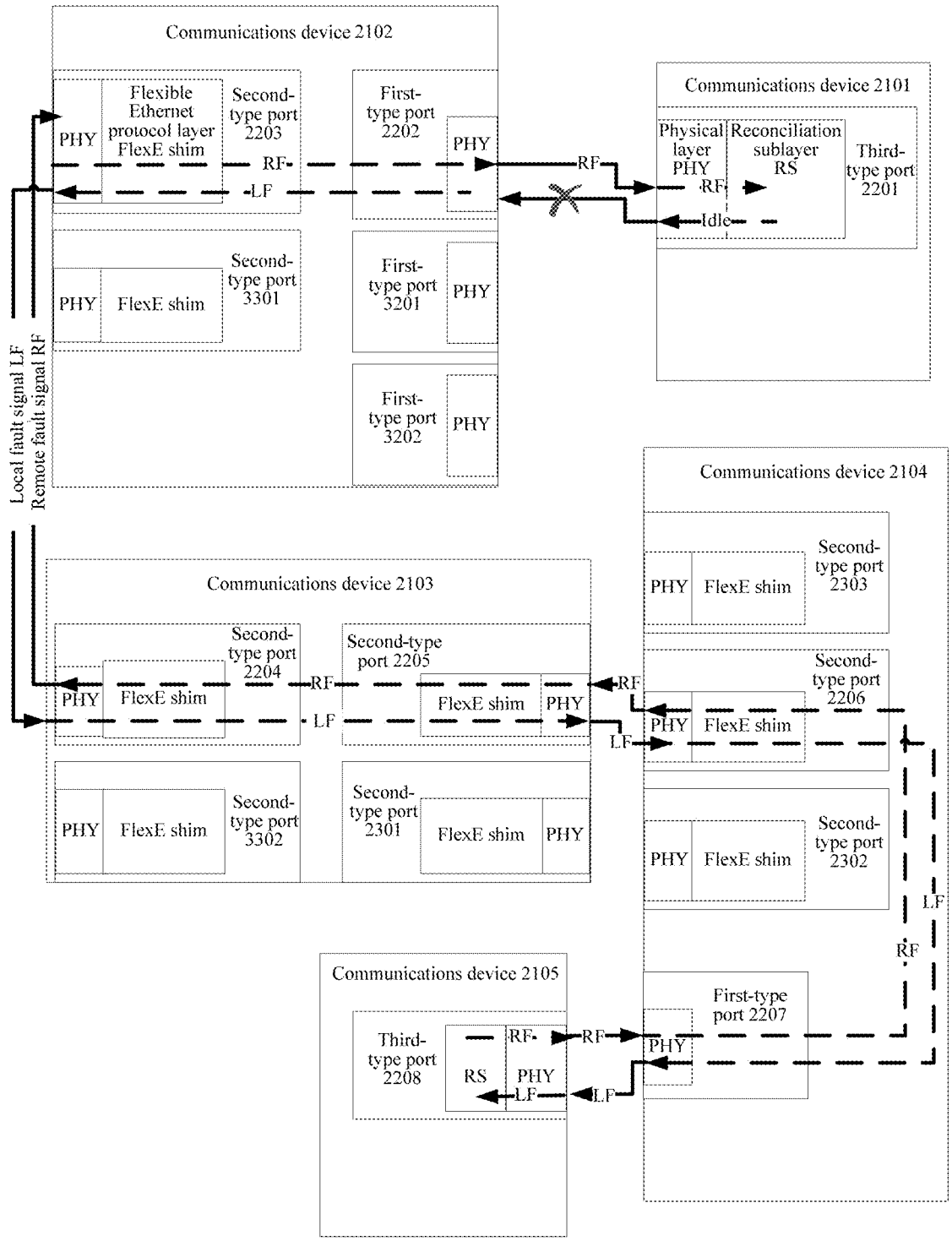
FIG. 5 is a schematic diagram of a fault-information transmission path based on the system architecture shown in FIG. 4.

FIG. 5 is a schematic diagram of an example of a fault-information transmission path based on the system architecture shown in FIG. 4. As shown in FIG. 5, after a FlexE network is introduced in a standard Ethernet protocol, if a link from the communications device 2101 to the communications device 2102 is faulty, for example, a link for sending information from the third-type port 2201 to the first-type port 2202 is faulty, after the first-type port 2202 detects a link fault, a physical layer of the first-type port 2202 generates local fault information (Local Fault, LF). The first-type port 2202 detects the link fault in a plurality of implementations. For example, the first-type port 2202 does not receive information within preset duration. Because the first-type port does not have an RS, and none of the first-type ports and the second-type ports of the communications device 2102, the communications device 2103, and the communications device 2104 has an RS, the LF generated by the first-type port 2202 is transmitted to a layer 1.5 switching unit of the communications device 2102, to switch to the second-type port 2203. Because the second-type port does not have an RS either, the LF information is transmitted on a flexible Ethernet protocol network, until the LF information is transparently transmitted to an RS of the third-type port 2208 of the communications device 2105. In other words, the LF generated by the first-type port 2202 is finally transmitted to the RS of the third-type port 2208 along the second-type port 2203, the second-type port 2204, the second-type port 2205, the second-type port 2206, and the first-type port 2207. When the RS of the third-type port 2208 detects the LF information, data transmission from a VIAC layer of the third-type port 2208 may stop, and RF information is generated and is continuously delivered to a PCS layer of the third-type port 2208. The RF information is transmitted to an RS of the third-type port 2201 along the first-type port 2207, the second-type port 2206, the second-type port 2205, the second-type port 2204, the second-type port 2203, and the first-type port 2202. When the RS of the third-type port 2201 detects the RF information, data transmission from a MAC layer of the third-type port 2201 stops, and an idle control block is generated and is continuously delivered to a PCS layer of the third-type port 2201.

It can be learned from the example shown in FIG. 5 that in this embodiment of this application, the fault information (for example, the LF and/or the RF) generated when the link between the first-type ports is faulty is transmitted on the flexible Ethernet protocol network. In the prior art, LF is frequently generated by a first-type port, and RF is continuously transmitted, and therefore fault information generated when a link between first-type ports is faulty occupies a relatively large proportion of bandwidth. In view of this problem, first fault information is obtained by using a first port, and second fault information is sent based on the first fault information by using a second port in this embodiment of this application. The first port is a first-type port, the first-type port transmits information according to a standard Ethernet protocol, and the first fault information is first-type fault information. The second port is a second-type port, and the second-type port transmits information according to a flexible Ethernet protocol. The first-type fault information includes at least one of local fault information and remote fault information, and relatively large transmission path bandwidth is occupied in transmitting the local fault information and the remote fault information. Therefore, through transmission of the second fault information, not only a fault can be reported in joint networking in which the standard Ethernet protocol and the flexible Ethernet protocol are used, but also used transmission path bandwidth of a link corresponding to the flexible Ethernet protocol can be reduced.

Further, after a flexible Ethernet protocol network is introduced in the standard Ethernet protocol, a physical layer of the second-type port also generates local fault information (for example, the LF) after detecting a fault. For example, the FlexE Implementation Agreement 1.o specifications specify that if a FlexE port (namely, a second-type port) detects an information failure (a link fault), a synchro-lock failure of a flexible Ethernet protocol group overhead frame (FlexE Group Overhead Frame), a high bit error rate, an alignment failure of a plurality of PHYs belonging to a same flexible Ethernet protocol group (FlexE Group), inconsistent PHY mapping tables, PHY numbers, and FlexE group number fields of flexible Ethernet protocol group overhead frames (FlexE Group Overhead Frames) received by different flexible Ethernet protocol physical ports belonging to a same FlexE Group, or a great deviation between receive clocks of a plurality of PHYs, Ethernet LF fault information is continuously inserted into all flexible Ethernet protocol clients (FlexE Clients) corresponding to the FlexE physical port (the second-type port).

Optionally, a protection switching function may be configured on the communications device with a second-type port. The protection switching function, which may be referred to as protection switching in English or automatic protection switching (Automatic Protection Switching, APS), may specifically mean that transmission of data traffic is switched from one working path to a protection path (for example, switched from a working link to a standby link) corresponding to the working path due to a fault or manual intervention. If the protection switching function is configured on the communications device, the protection switching function is enabled when LF is detected. The protection switching function is configured in the flexible Ethernet protocol to provide a self-healing mechanism in the flexible Ethernet protocol. In other words, if a fault occurs inside a flexible Ethernet protocol network, self-healing can be implemented by using the protection switching function.

Figure 6:
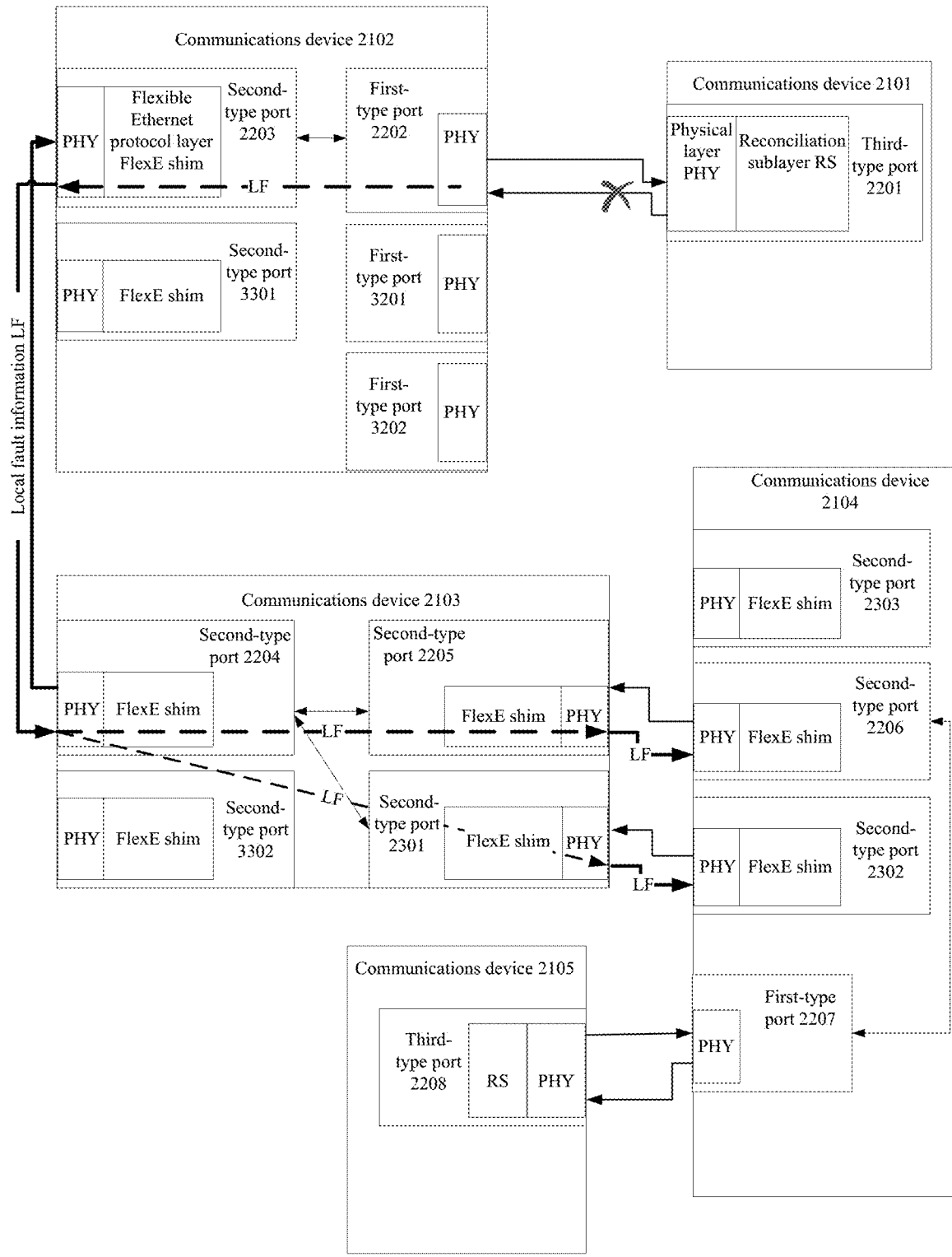
FIG. 6 is a schematic diagram of another fault-information transmission path based on the system architecture shown in FIG. 4.

FIG. 6 is a schematic diagram of an example of another fault-information transmission path based on the system architecture shown in FIG. 4. As shown in FIG. 6, at least one link may exist between the communications devices in this embodiment of this application. For example, two links exist between the communications device 2103 and the communications device 2104: a link between the second-type port 2205 and the second-type port 2206 and a link between a second-type port 2301 and a second-type port 2302. For another example, two links exist between the communications device 2103 and the communications device 2104: a link between the second-type port 2205 and the second-type port 2206 and a link between the second-type port 2205 and a second-type port 2303 (not shown in this example diagram).

Optionally, only one link between the communications device 2103 and the communications device 2104 is in a working state in a time period. A link currently in the working state may also be referred to as a working link, and a link currently not in the working state may be referred to as a standby link. For example, if the link between the second-type port 2205 and the second-type port 2206 is in the working state in a time period, in other words, to-be-transmitted data between the communications device 2103 and the communications device 2104 is all transmitted by using the link between the second-type port 2205 and the second-type port 2206, the link between the second-type port 2205 and the second-type port 2206 is referred to as a working link, and the link, currently not in the working state, between the second-type port 2301 and the second-type port 2302 is referred to as a standby link. In a next time period, if the link between the second-type port 2301 and the second-type port 2302 is in the working state, the link between the second-type port 2301 and the second-type port 2302 is referred to as a working link, and the link between the second-type port 2205 and the second-type port 2206 is referred to as a standby link.

If a protection switching function is configured on the communications device, the protection switching function is enabled when LF is detected. As shown in FIG. 6, a protection switching function is configured on the communications device 2104, for example, two links are configured between the communications device 2103 and the communications device 2104: the link between the second-type port 2205 and the second-type port 2206 and the link between the second-type port 2301 and the second-type port 2302. A current working link is the link between the second-type port 2205 and the second-type port 2206. Optionally, a protection switching function may be configured at a physical layer of a second-type port. Optionally, a protection switching function may be configured at a flexible Ethernet protocol layer of each second-type port.

In a case in which a fault may occur, in FIG. 6, if a link between the communications device 2103 and the communications device 2104 is faulty, for example, the link for sending information from the second-type port 2205 to the second-type port 2206 is faulty, a physical layer of the second-type port 2206 generates LF, and when receiving the LF, a flexible Ethernet protocol layer (marked as FlexE shim in the figure) of the second-type port 2206 enables a protection switching function, in other words, enables a standby link corresponding to the second-type port 2206. To be specific, the working link is changed from the link between the second-type port 2205 and the second-type port 2206 to the link between the second-type port 2301 and the second-type port 2302. In other words, the link between the second-type port 2301 and the second-type port 2302 is enabled as the working link, and the link between the second-type port 2205 and the second-type port 2206 is changed to the standby link. Further, there is an association relationship between the second-type port 2204 and the second-type port 2301, but a connection between the second-type port 2204 and the second-type port 2205 is an inactive state. It can be learned that when there is a fault inside the flexible Ethernet protocol, the flexible Ethernet protocol may enable the standby link to continue to work. This capability may also be referred to as a self-healing capability of the flexible Ethernet protocol. When the standby link of the second-type port 2205 is enabled, the second-type port 2302 does not receive LF any longer, where the LF is received because the link for sending information from the second-type port 2205 to the second-type port 2206 is faulty.

In another case in which a fault may occur, as shown in FIG. 6, if a link for sending information from the third-type port 2201 to the first-type port 2202 is faulty, a physical layer of the first-type port 2202 generates LF after the first-type port 2202 detects a link fault, and the LF is transmitted to the communications device 2104. After detecting the LF, the communications device 2104 triggers a protection switching function, to change a link corresponding to the second-type port 2206 to a standby link. To be specific, the working link is changed from the link between the second-type port 2205 and the second-type port 2206 to the link between the second-type port 2301 and the second-type port 2302. In other words, the link between the second-type port 2301 and the second-type port 2302 is enabled as the working link, and the link between the second-type port 2205 and the second-type port 2206 is changed to the standby link. In this case, the physical layer of the first-type port 2202 continues generating the LF, and therefore the communications device 2104 still receives the LF even after enabling the protection switching function. In this case, the communications device 2104 may enable the protection switching function again, to change the working link from the link between the second-type port 2301 and the second-type port 2302 to the link between the second-type port 2205 and the second-type port 2206. It can be learned that the LF information received by the communications device is generated when a fault occurs between the first-type ports, and therefore the LF is still sent to the communications device 2104 even after the communications device 2104 enables the automatic protection switching function. As a result, switching flapping occurs because the working link is changed repeatedly. In other words, the protection switching function of the flexible Ethernet protocol is originally intended to implement a self-healing function for fault information inside the flexible Ethernet protocol. However, once fault information outside the flexible Ethernet protocol network enters the flexible Ethernet protocol, a communications device may mistake the fault information for fault information inside the flexible Ethernet protocol network, and therefore switch the working link repeatedly, causing switching flapping. For this case, in this embodiment of this application, the second fault information is second-type fault information, and may be used to indicate that the link corresponding to the standard Ethernet protocol is faulty, laying a foundation for determining whether a link corresponding to the flexible Ethernet protocol or the link corresponding to the standard Ethernet protocol is faulty.

Figure 7:
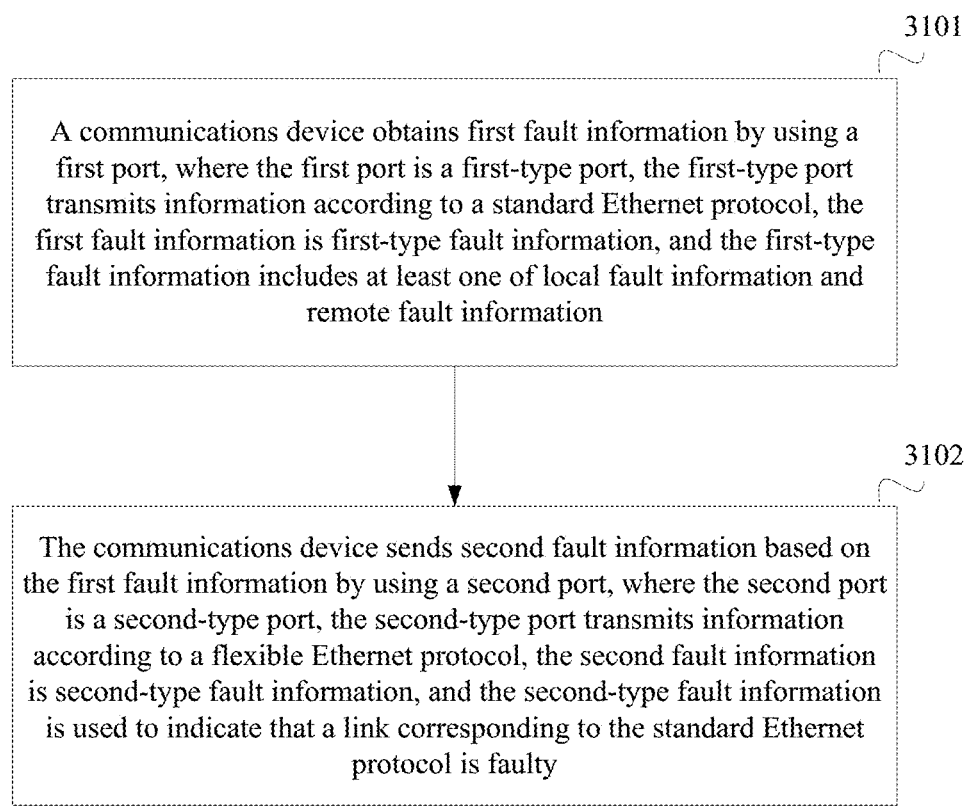
FIG. 7 is a schematic flowchart of a communication method according to an embodiment of this application.

Based on the foregoing content, an embodiment of this application provides a communication method. FIG. 7 is a schematic flowchart of an example of a communication method according to an embodiment of this application. As shown in FIG. 7, the method includes step 3101 and step 3102.

Step 3101: A communications device obtains first fault information by using a first port, where the first port is a first-type port, the first-type port transmits information according to a standard Ethernet protocol, the first fault information is first-type fault information, and the first-type fault information includes at least one of local fault information and remote fault information. Optionally, the communications device includes a plurality of first-type ports, and the first port is a first-type port in the plurality of first-type ports that has an association relationship with at least one second-type port.

The first-type port in this embodiment of this application may be a port supporting only the standard Ethernet protocol, or a port supporting both the standard Ethernet protocol and a flexible Ethernet protocol. In this case, the first-type port is a port whose currently used protocol is the standard Ethernet protocol. The second-type port in this embodiment of this application may be a port supporting only the flexible Ethernet protocol, or a port supporting both the standard Ethernet protocol and the flexible Ethernet protocol. In this case, the second-type port is a port whose currently used protocol is the flexible Ethernet protocol. For an example, refer to the related content in FIG. 2. Details are not described herein again.

Step 3102: The communications device sends second fault information based on the first fault information by using a second port, where the second port is a second-type port, the second-type port transmits information according to a flexible Ethernet protocol, the second fault information is second-type fault information, and the second-type fault information is used to indicate that a link corresponding to the standard Ethernet protocol is faulty. Optionally, the communications device in this step may be the communications device including two types of ports in FIG. 2 to FIG. 6, for example, the communications device 2102 or the communications device 2104 in FIG. 2 to FIG. 6. In step 3102, there is an association relationship between the first port and the second port. To be specific, information obtained by the first port is all transmitted by using the second port, and information obtained by the second port is all transmitted by using the first port. Optionally, the communications device includes a plurality of second-type ports, and the second port is a second-type port in the plurality of second-type ports that has an association relationship with at least one first-type port.

In this embodiment of this application, optionally, when the communications device obtains the first-type fault information by using the first-type port, if the information needs to be sent by using the second-type port, the second-type fault information is sent by using the second-type port.

In this embodiment of this application, the first fault information is obtained by using the first port, and the second fault information is sent based on the first fault information by using the second port. The first port is a first-type port, the first-type port transmits information according to the standard Ethernet protocol, the first fault information is first-type fault information, the second port is a second-type port, and the second-type port transmits information according to the flexible Ethernet protocol. The first-type fault information includes at least one of the local fault information and the remote fault information, the second fault information is second-type fault information, and the second-type fault information is used to indicate that the link corresponding to the standard Ethernet protocol is faulty. Therefore, through transmission of the second fault information, not only a fault can be reported in joint networking in which the standard Ethernet protocol and the flexible Ethernet protocol are used, but also a foundation can be laid for determining whether a link corresponding to the flexible Ethernet protocol or the link corresponding to the standard Ethernet protocol is faulty.

Figure 8:
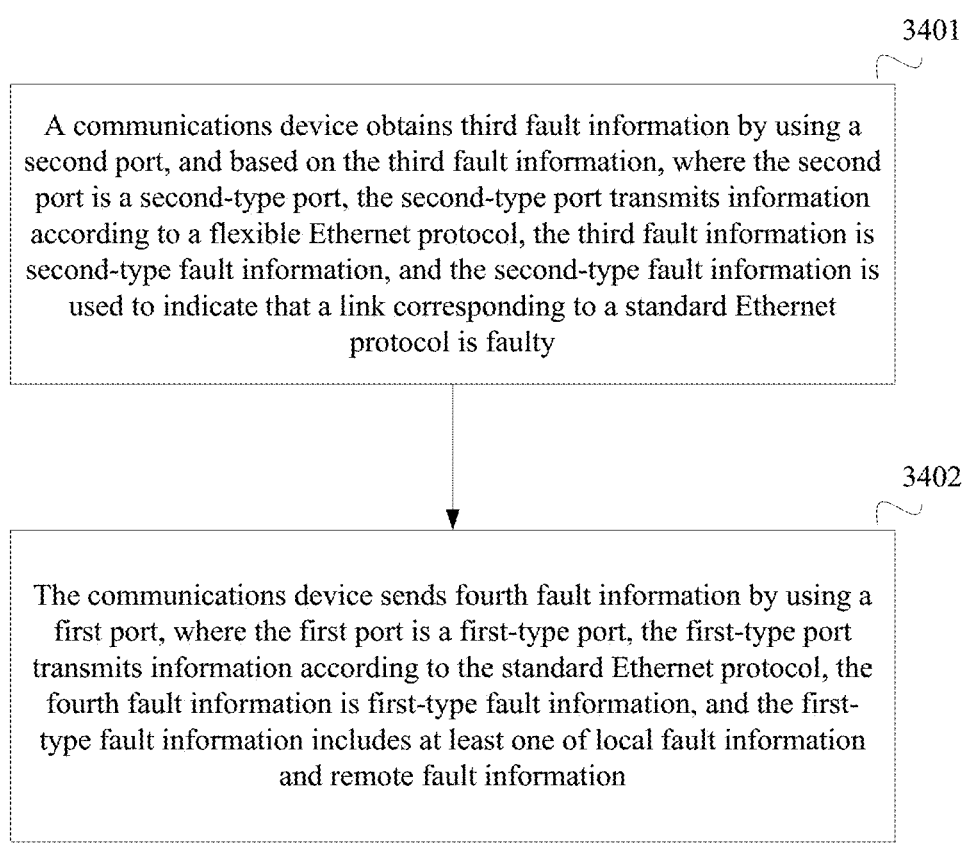
FIG. 8 is a schematic flowchart of a communication method according to an embodiment of this application.

Based on the foregoing content, an embodiment of this application provides another communication method. FIG. 8 is a schematic flowchart of an example of a communication method according to an embodiment of this application. As shown in FIG. 8, the method includes step 3401 and step 3402.

Optionally, a communications device performing step 3401 and step 3402 and the communications device performing step 3101 and step 3102 may be two different communications devices. In this case, a first port included in the communications device performing step 3401 and step 3402 and the first port of the communications device performing step 3101 and step 3102 are two different ports, and a second port included in the communications device performing step 3401 and step 3402 and the second port of the communications device performing step 3101 and step 3102 are two different ports. Optionally, the communications device performing step 3101 and step 3102 may be the communications device 2102 in FIG. 4 to FIG. 6, and the communications device performing step 3401 and step 3402 may be the communications device 2104 in FIG. 4 to FIG. 6. In this case, the first port of the communications device performing step 3101 and step 3102 may be the first-type port 2202, and the second port of the communications device performing step 3101 and step 3102 may be the second-type port 2203; the first port of the communications device performing step 3401 and step 3402 may be the first-type port 2207, and the second port of the communications device performing step 3401 and step 3402 may be the second-type port 2206.

Optionally, the communications device performing step 3401 and step 3402 may be the communications device performing step 3101 and step 3102. In this case, the first port included in the communications device performing step 3401 and step 3402 and the first port of the communications device performing step 3101 and step 3102 may be two different ports or two same ports, and the second port included in the communications device performing step 3401 and step 3402 and the second port of the communications device performing step 3101 and step 3102 may be two different ports or two same ports. In this case, step 3401 and step 3402 may be performed after step 3101 and step 3102, or may be performed before step 3101 and step 3102.

Step 3401: The communications device obtains third fault information by using a second port, and based on the third fault information, where the second port is a second-type port, the second-type port transmits information according to a flexible Ethernet protocol, the third fault information is second-type fault information, and the second-type fault information is used to indicate that a link corresponding to a standard Ethernet protocol is faulty. Optionally, the communications device includes a plurality of second-type ports, and the second port is a second-type port in the plurality of second-type ports that has an association relationship with at least one first-type port.

In this embodiment of this application, optionally, when the communications device obtains the second-type fault information by using the second-type port, if the information needs to be sent by using a first-type port, first-type fault information is sent by using the first-type port.

The first-type port in this embodiment of this application may be a port supporting only the standard Ethernet protocol, or a port supporting both the standard Ethernet protocol and the flexible Ethernet protocol. In this case, the first-type port is a port whose currently used protocol is the standard Ethernet protocol. The second-type port in this embodiment of this application may be a port supporting only the flexible Ethernet protocol, or a port supporting both the standard Ethernet protocol and the flexible Ethernet protocol. In this case, the second-type port is a port whose currently used protocol is the flexible Ethernet protocol. For an example, refer to the related content in FIG. 2. Details are not described herein again.

Step 3402: The communications device sends fourth fault information by using a first port, where the first port is a first-type port, the first-type port transmits information according to the standard Ethernet protocol, the fourth fault information is first-type fault information, and the first-type fault information includes at least one of local fault information and remote fault information. Optionally, the communications device in this step may be the communications device including two types of ports in FIG. 2 to FIG. 6, for example, the communications device 2102 or the communications device 2104 in FIG. 2 to FIG. 6. In step 3402, there is an association relationship between the first port and the second port. To be specific, information obtained by the first port is all transmitted by using the second port, and information obtained by the second port is all transmitted by using the first port. Optionally, the communications device includes a plurality of first-type ports, and the first port is a first-type port in the plurality of first-type ports that has an association relationship with at least one second-type port.

In this embodiment of this application, the third fault information is obtained by using the second port, and the fourth fault information is sent based on the third fault information by using the first port. The first-type fault information includes at least one of the local fault information and the remote fault information, and the second-type fault information is used to indicate that the link corresponding to the standard Ethernet protocol is faulty. Therefore, through transmission of the second fault information, first, a fault can be reported in joint networking in which the standard Ethernet protocol and the flexible Ethernet protocol are used, second, a foundation can be laid for determining whether a link corresponding to the flexible Ethernet protocol or the link corresponding to the standard Ethernet protocol is faulty, and third, a solution of reporting a fault on a standard Ethernet protocol network by using the first-type fault information can also be supported.

Based on the communication methods described in FIG. 7 and FIG. 8, the following further illustrates several possible designs in FIG. 7 and FIG. 8. The following method embodiments are all applicable to the solutions described in FIG. 7 and FIG. 8.

In this embodiment of this application, the local fault information and the remote fault information are continuously transmitted 66b blocks, and therefore transmission path bandwidth is occupied. According to the solution of this embodiment of this application, the second-type fault information may be transmitted over the flexible Ethernet protocol, and sending frequency of the second fault information may be set flexibly, for example, setting the sending frequency of the second fault information to be smaller than sending frequency of the first fault information. This can reduce used transmission path bandwidth of a link corresponding to the flexible Ethernet protocol. For example, the first fault information is the remote fault information, and the second fault information is client-service-type remote fault information. The remote fault information is continuously sent, and relatively large bandwidth is occupied. If a piece of client-service-type remote fault information is sent at intervals of a specific quantity of code blocks, occupied bandwidth can be reduced. Further, saved network bandwidth may be used to carry another service, including statistical multiplexing or the like. In addition, the second-type fault information is used to indicate that the link corresponding to the standard Ethernet protocol is faulty, avoiding that a protection switching function is triggered by mistake when the link corresponding to the standard Ethernet protocol is faulty. Further, in this embodiment of this application, when the FlexE is used for networking, not only link (which may also be referred to as LINK in English) negotiation based on local fault information and/or remote fault information in standard Ethernet 802.3 specifications (Clause 81.3.4 of IEEE 802.3) can be supported, but also correct implementation of a self-healing mechanism within the flexible Ethernet protocol network can be ensured.

In an optional implementation, in step 3101, the obtaining, by a communications device, first fault information by using a first port may be: generating, by the communications device, local fault information by using a physical layer of the first port, or receiving, by the communications device, remote fault information by using the first port. For example, if the first port is the first-type port 2202, and in FIG. 6, the link for sending information from the third-type port 2201 to the first-type port 2202 is faulty, the physical layer of the first-type port 2202 generates local fault information. For another example, if the link for sending information from the first-type port 2202 to the third-type port 2201 is faulty, the physical layer of the third-type port 2201 generates local fault information, and after the RS of the third-type port 2201 detects the local fault information, remote fault information is generated and is transmitted to the first-type port 2202.

In this embodiment of this application, two types of second-type fault information may be defined: client-service-type local fault information and client-service-type remote fault information. The client-service-type local fault information may be referred to as client service fault, CSF for short. For clearer description in FIG. 9, CSF is used to represent the client-service-type local fault information. The client-service-type remote fault information may be referred to as remote client service fault, RCSF for short. For clearer description in FIG. 9, RCSF is used to represent the client-service-type remote fault information. Client-service-type in the client-service-type local fault information and the client-service-type remote fault information is a broader term, and may specifically refer to related content of a service serving a client. Client-service-type in the client-service-type local fault information and the client-service-type remote fault information does not limit the second-type fault information in this embodiment of this application, and is used only for distinguishing between the local fault information (LF for short) and the remote fault information (RF for short) in this embodiment of this application.

Optionally, the sending second fault information based on the first fault information by using a second port includes: generating, based on the first fault information, the second fault information corresponding to the first fault information, and sending the second fault information by using the second port. If the first fault information is local fault information, the second fault information corresponding to the first fault information is client-service-type local fault information; if the first fault information is remote fault information, the second fault information corresponding to the first fault information is client-service-type remote fault information. In other words, optionally, if the first-type fault information is local fault information, the second-type fault information corresponding to the first-type fault information is the client-service-type local fault information; if the first-type fault information is remote fault information, the second-type fault information corresponding to the first-type fault information is the client-service-type remote fault information. Correspondingly, if the second-type fault information is client-service-type local fault information, the first-type fault information corresponding to the second-type fault information is local fault information; if the second-type fault information is client-service-type remote fault information, the first-type fault information corresponding to the second-type fault information is remote fault information.

Optionally, the second fault information corresponding to the first fault information generated based on the first fault information may be newly generated second fault information, or may be generated by adding indication information to the first fault information, where the indication information is used to indicate that the link corresponding to the standard Ethernet protocol is faulty. In other words, the second-type fault information corresponding to the first-type fault information generated based on the first-type fault information may be newly generated second-type fault information, or may be generated by adding indication information to the first-type fault information, where the indication information is used to indicate that the link corresponding to the standard Ethernet protocol is faulty.

Optionally, in step 3102, the sending, by the communications device, second fault information based on the first fault information by using a second port includes: if the obtained first-type fault information meets a first preset condition, sending the second fault information based on the first fault information by using the second port, where the first preset condition includes: a quantity of obtained first preset code blocks is not less than a first quantity threshold, and an interval between any two obtained adjacent first preset code blocks does not exceed a first-preset-code-block interval. In this embodiment of this application, the second fault information is sent when the condition that the quantity of obtained first preset code blocks is not less than the first quantity threshold, and the interval between any two obtained adjacent first preset code blocks does not exceed the first-preset-code-block interval is met. The communications device may continuously detect the quantity of obtained first preset code blocks, and stop sending the second fault information if the communications device detects that the condition that the quantity of obtained first preset code blocks is not less than the first quantity threshold, and the interval between any two obtained adjacent first preset code blocks does not exceed the first-preset-code-block interval is not met. This can avoid a misoperation caused by a relatively small quantity of fault information and further improve operation accuracy.

For example, a first 66-bit block control block is the first preset code block, the first-preset-code-block interval is 128 code blocks, and the first quantity threshold is 4. When four first 66-bit block (or referred to as first 66-bit blocks) control blocks are detected, and any two adjacent first 66-bit block control blocks are separated by no more than 128 code blocks, the second fault information is sent based on the first fault information by using the second port. In a specific detection process, after detecting a $1^{st}$ first 66-bit block control block, a counter may record 1, and if one more first 66-bit block control block is detected in the following 128 blocks, the counter records 2. If no more first 66-bit block control block is detected in the following 128 blocks, an event record is cleared (in other words, the counter is reset to zero). When a first 66-bit block control block is detected next time, the counter counts from 1 again. The process repeats until four valid first 66-bit block control blocks are detected in a row (in other words, the counter reaches 4), and it is considered that LF or RF information is obtained. The communications device continuously performs detection, and sends the second fault information when a value recorded by the counter is not less than 4, or stops sending the second fault information when a value recorded by the counter is less than 4. In other words, correspondingly, if the condition that the quantity of obtained first preset code blocks is not less than the first quantity threshold, and the interval between any two obtained adjacent first preset code blocks does not exceed the first-preset-code-block interval is not met, it may be considered that a fault is rectified, and the second fault information is not sent any longer. For example, if the communications device detects no first 66-bit block control block in 128 consecutive code blocks, it is considered that the fault is rectified.

Optionally, the sending, by the communications device, second fault information based on the first fault information by using a second port includes: if a quantity of first fault information obtained within first preset duration is greater than a first quantity threshold, sending the second fault information based on the first fault information by using the second port. Optionally, the first fault information may be the first preset code block. In other words, if the obtained first-type fault information meets the first preset condition, the second fault information is sent based on the first fault information by using the second port, where the first preset condition includes: a quantity of first-type fault information obtained within the first preset duration is greater than the first quantity threshold. In this case, the obtained first-type fault information is the first fault information. In this embodiment of this application, the second fault information is sent when the condition that the quantity of first fault information obtained within the first preset duration is greater than the first quantity threshold is met. The communications device continuously detects the quantity of obtained first fault information, and stops sending the second fault information if the communications device detects that the condition that the quantity of first fault information obtained within the first preset duration is greater than the first quantity threshold is not met.

For example, a first 66-bit block control block is the first preset code block, and the first quantity threshold is 4. The second fault information is sent when it is determined that duration used to obtain first preset code blocks of a quantity equal to the first quantity threshold is not greater than the first preset duration, for example, duration for consecutively obtaining four first 66-bit blocks is not greater than the first preset duration. Optionally, the communications device continuously detects the obtained first preset code block, and if the duration for consecutively obtaining four first 66-bit blocks is greater than the first preset duration, determines that the condition that the quantity of first fault information obtained within the first preset duration is greater than the first quantity threshold is met, and stops sending the second fault information.

Optionally, the method further includes: obtaining, by the communications device, sixth fault information by using a fifth port, where the fifth port is a second-type port, the sixth fault information is first-type fault information, and a standby link is configured for the fifth port; and enabling the standby link corresponding to the fifth port. Optionally, in this embodiment of this application, if a protection switching function is configured on the communications device, when receiving fault information inside a flexible Ethernet protocol network, the communications device enables the protection switching function; when receiving fault information outside the flexible Ethernet protocol network, the communications device does not enable the switching function. The second-type fault information in this embodiment of this application may indicate that the link corresponding to the standard Ethernet protocol is faulty. Therefore, the communications device does not enable the protection switching function when receiving the second-type fault information, and enables the protection switching function when receiving the first-type fault information. It can be learned that in this embodiment of this application, whether the link corresponding to the standard Ethernet protocol is faulty or a link corresponding to the flexible Ethernet protocol is faulty can be determined by using the first-type fault information and the second-type fault information, to prevent the protection switching function from being triggered when the link corresponding to the standard Ethernet protocol is faulty. Optionally, for enabling the standby link corresponding to the fifth port, refer to the process of enabling the standby link between the communications device 2103 and the communications device 2104 in FIG. 6. Details are not described herein again.

In this embodiment of this application, if fault information is transmitted from a standard Ethernet protocol network to the flexible Ethernet protocol network, the second-type fault information may be generated based on the first-type fault information, and is transmitted on the flexible Ethernet protocol network. Correspondingly, if fault information is transmitted from the flexible Ethernet protocol network to the standard Ethernet protocol network, the first-type fault information may be generated based on the second-type fault information, and is transmitted on the standard Ethernet protocol network. Optionally, in this embodiment of this application, the third fault information is obtained by using the second port, where the third fault information is second-type fault information; and the fourth fault information is sent based on the third fault information by using the first port, where the fourth fault information is first-type fault information. In this way, the second-type fault information may be transmitted inside the flexible Ethernet network, and the first-type fault information may be transmitted outside the flexible Ethernet network, so that whether a link corresponding to the flexible Ethernet protocol or the link corresponding to the standard Ethernet protocol is faulty can be determined based on a type of fault information. In this embodiment of this application, the fault information is information indicating that a link is faulty, and is a broader term. The fault information may include the first-type fault information and/or the second-type fault information.

Optionally, the sending fourth fault information based on the third fault information by using the first port includes: generating, based on the third fault information, the fourth fault information corresponding to the third fault information, and sending the fourth fault information by using the first port. The third fault information is client-service-type local fault information, and the fourth fault information corresponding to the third fault information is local fault information; or the third fault information is client-service-type remote fault information, and the fourth fault information corresponding to the third fault information is remote fault information.

Optionally, the fourth fault information corresponding to the third fault information generated based on the third fault information may be newly generated fourth fault information, or may be obtained by deleting indication information from the third fault information, where the indication information is used to indicate that the link corresponding to the standard Ethernet protocol is faulty. In other words, the first-type fault information corresponding to the second-type fault information generated based on the second-type fault information may be newly generated first-type fault information, or may be obtained by deleting indication information from the second-type fault information, where the indication information is used to indicate that the link corresponding to the standard Ethernet protocol is faulty.

Optionally, the sending, by the communications device, fourth fault information based on the third fault information by using the first port includes: if the obtained second-type fault information meets a second preset condition, sending the fourth fault information based on the third fault information by using the first port, where the second preset condition includes: a quantity of obtained second preset code blocks is not less than a second quantity threshold, and an interval between any two obtained adjacent second preset code blocks does not exceed a second-preset-code-block interval. In other words, in this embodiment of this application, the fourth fault information is sent when the condition that the quantity of obtained second preset code blocks is not less than the second quantity threshold, and the interval between any two obtained adjacent second preset code blocks does not exceed the second-preset-code-block interval is met. The communications device continuously detects the quantity of obtained second preset code blocks, and stops sending the fourth fault information if the communications device detects that the condition that the quantity of obtained second preset code blocks is not less than the second quantity threshold, and the interval between any two obtained adjacent second preset code blocks does not exceed the second-preset-code-block interval is not met. This can avoid a misoperation caused by a relatively small quantity of fault information and further improve operation accuracy.

For example, a second 66-bit block control block is the second preset code block, the second-preset-code-block interval is 128 code blocks, and the second quantity threshold is 4. When four second 66-bit block (or referred to as second 66-bit blocks) control blocks are detected, where the second 66-bit block control block may carry indication information indicating that the link corresponding to the standard Ethernet protocol is faulty, and when any two adjacent second 66-bit block control blocks are separated by no more than 128 code blocks, the fourth fault information is sent based on the third fault information by using the first port. In a specific detection process, after detecting a $1^{st}$ second 66-bit block control block, a counter may record 1, and if one more second 66-bit block control block is detected in the following 128 blocks, the counter records 2. If no more second 66-bit block control block is detected in the following 128 blocks, an event record is cleared (in other words, the counter is reset to zero). When a second 66-bit block control block is detected next time, the counter counts from 1 again. The process repeats until four valid second 66-bit block control blocks are detected in a row, in other words, the counter reaches 4, and it is considered that LF or RF information is obtained. The communications device continuously performs detection, and sends the fourth fault information when a value recorded by the counter is not less than 4, or stops sending the fourth fault information when a value recorded by the counter is less than 4. In other words, correspondingly, if the condition that the quantity of obtained second preset code blocks is not less than the second quantity threshold, and the interval between any two obtained adjacent second preset code blocks does not exceed the second-preset-code-block interval is not met, it may be considered that a fault is rectified, and the fourth fault information is not sent any longer. For example, if the communications device detects no second 66-bit block control block in 128 consecutive code blocks, it is considered that the fault is rectified.

Optionally, the sending, by the communications device, fourth fault information based on the third fault information by using the first port includes: if a quantity of third fault information obtained within second preset duration is greater than a second quantity threshold, sending the fourth fault information based on the third fault information by using the first port. Optionally, the third fault information may be the second preset code block. In other words, if the obtained second-type fault information meets the second preset condition, the fourth fault information is sent based on the third fault information by using the first port, where the second preset condition includes: the quantity of third fault information obtained within the second preset duration is greater than the second quantity threshold. In this case, the obtained second-type fault information is the third fault information. In this embodiment of this application, the fourth fault information is sent when the condition that the quantity of third fault information obtained within the second preset duration is greater than the second quantity threshold is met. The communications device continuously detects the quantity of obtained third fault information, and stops sending the fourth fault information if the communications device detects that the condition that the quantity of third fault information obtained within the second preset duration is greater than the second quantity threshold is not met.

For example, a second 66-bit block control block is the second preset code block, and the second quantity threshold is 4. The fourth fault information is sent when it is determined that duration used to obtain second preset code blocks of a quantity equal to the second quantity threshold is not greater than the second preset duration, for example, duration for consecutively obtaining four second 66-bit blocks is not greater than the second preset duration. Optionally, the communications device continuously detects the obtained second preset code block, and if the duration for consecutively obtaining four second 66-bit blocks is greater than the first preset duration, determines that the condition that the quantity of second fault information obtained within the second preset duration is greater than the second quantity threshold is met, and stops sending the fourth fault information.

In this embodiment of this application, optionally, the method further includes: obtaining fifth fault information by using a third port, where the third port is a second-type port, and the fifth fault information is first-type fault information or second-type fault information; and sending the fifth fault information by using a fourth port, where the fourth port is a second-type port. In this way, the first-type fault information and the second-type fault information may be transparently transmitted inside a flexible Ethernet network, and further, the second-type fault information may be transmitted inside the flexible Ethernet network, and the first-type fault information may be transmitted outside the flexible Ethernet network, so that whether a link corresponding to the flexible Ethernet protocol or the link corresponding to the standard Ethernet protocol is faulty can be determined based on a type of fault information. In other words, if there is an association relationship between two second-type ports, for example, there is an association relationship between the third port and the fourth port, information obtained by the third port is all transmitted by using the fourth port, and information obtained by the fourth port is all transmitted by using the third port. The third port is a second-type port, the fourth port is a second-type port, and both the third port and the fourth port can transparently transmit the obtained first-type fault information or second-type fault information. For example, the third port may be the second-type port 2204 of the communications device 2103 in FIG. 4 to FIG. 6, the fourth port may be the second-type port 2205 of the communications device 2103 in FIG. 4 to FIG. 6, and the second-type port 2204 and the second-type port 2205 may transparently transmit the obtained first-type fault information or second-type fault information. For another example, the third port and the fourth port may be two second-type ports of the communications device 2102 in FIG. 4 to FIG. 6.

In this embodiment of this application, optionally, the method further includes: obtaining seventh fault information by using a sixth port, where the sixth port is a first-type port, and the seventh fault information is first-type fault information; and sending the seventh fault information by using a seventh port, where the seventh port is a first-type port. In other words, if there is an association relationship between two first-type ports, for example, there is an association relationship between the sixth port and the seventh port, information obtained by the sixth port is all transmitted by using the seventh port, and information obtained by the seventh port is all transmitted by using the sixth port. The sixth port is a first-type port, the seventh port is a first-type port, and both the sixth port and the seventh port may transparently transmit obtained first-type fault information or second-type fault information. For example, the sixth port may be a first-type port 3201 of the communications device 2102 in FIG. 4, the seventh port may be a first-type port 3202 of the communications device 2102 in FIG. 4, and the first-type port 3201 and the first-type port 3202 may transparently transmit obtained first-type fault information or second-type fault information. In FIG. 4, there is an association relationship between the first-type port 3201 and the first-type port 3202, the first-type port 3201 may be connected to a first-type port of another communications device, and the first-type port 3202 may also be connected to a first-type port of another communications device.

Figure 9:
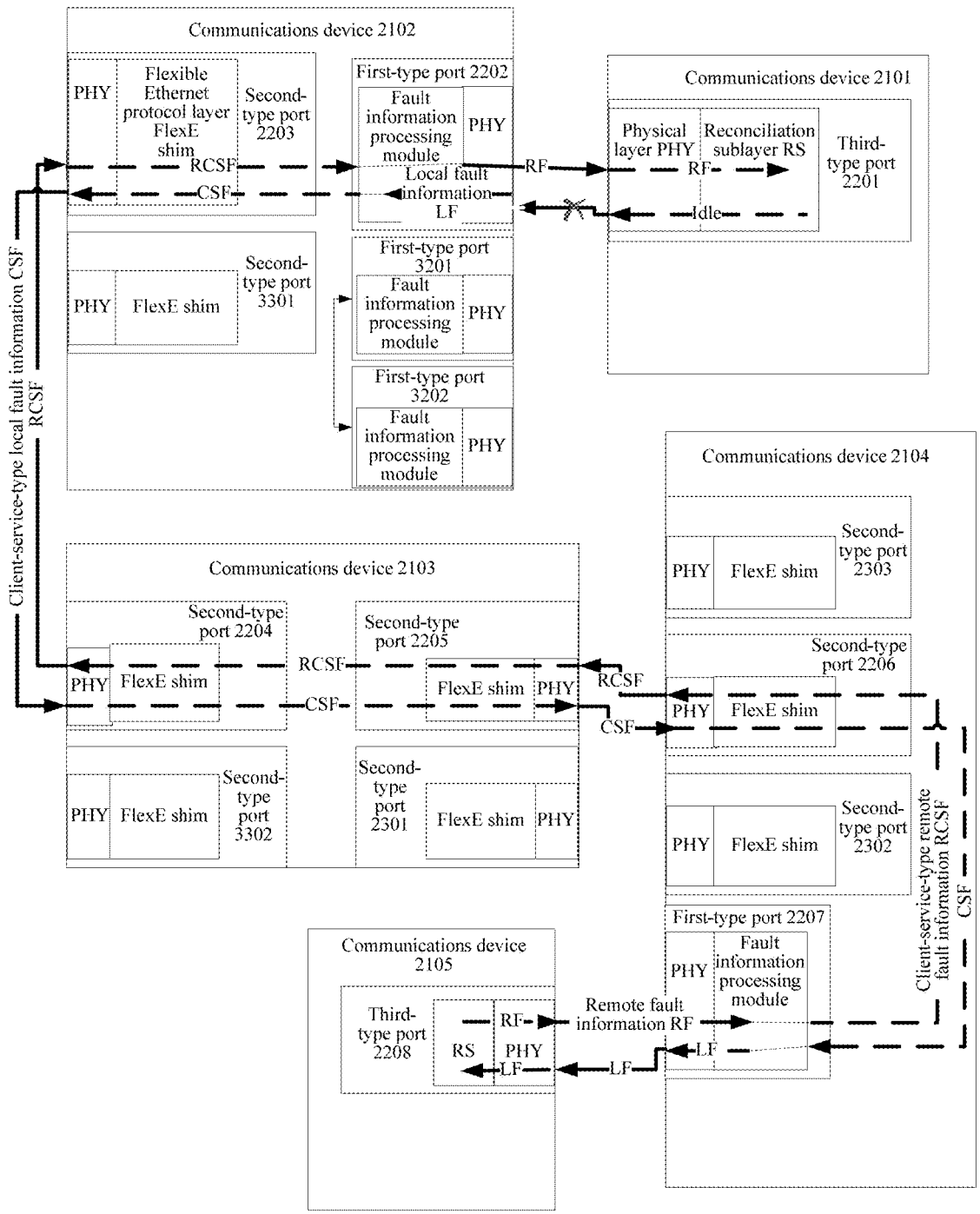
FIG. 9 is a schematic diagram of another fault-information transmission path based on the system architecture shown in FIG. 4 according to an embodiment of this application.

Based on the foregoing content, to further describe the solution provided in this embodiment of this application, this embodiment of this application provides a schematic flowchart of a communication method. FIG. 9 is a schematic diagram of an example of a fault-information transmission path based on the system architecture shown in FIG. 4 according to an embodiment of this application. As shown in FIG. 9, a fault information processing module may be configured on a communications device, for example, a fault information processing module is separately configured above physical layers of the first-type port 2202, the first-type port 3201, and the first-type port 3202 of the communications device 2102, and a fault information processing module is configured at an upper layer of a physical layer of the first-type port 2207 of the communications device 2104.

If a link for sending information from the third-type port 2201 of the communications device 2101 to the first-type port 2202 of the communications device 2102 is faulty, the physical layer of the first-type port 2202 generates local fault information (which is first-type fault information and is schematically marked as LF in the figure). Optionally, when the first-type fault information obtained by using the first-type port 2202 meets a condition, for example, the first preset condition, the communications device 2102 sends client-service-type local fault information (which is second-type fault information and is schematically marked as CSF in the figure). For example, this may be performed by the fault information processing module. When the first-type fault information received by the fault information processing module meets a condition, for example, the first preset condition, the fault information processing module sends the client-service-type local fault information. The first preset condition is: a quantity of first-type fault information obtained within first preset duration is greater than a first quantity threshold; or a quantity of obtained first preset code blocks is not less than the first quantity threshold, and an interval between any two obtained adjacent first preset code blocks does not exceed a first-preset-code-block interval.

The following uses an example to describe a case in which the client-service-type local fault information is sent when the condition that the quantity of obtained first preset code blocks is not less than the first quantity threshold, and the interval between any two obtained adjacent first preset code blocks does not exceed the first-preset-code-block interval is met. For example, a counter is set. When a first preset code block is detected, the counter is increased by 1, and a current counter value is 1. When a $2^{nd}$ first preset code block is received, if an interval between the first preset code block and the previous adjacent first preset code block is not greater than 128 code blocks, the counter is increased by 1; or if an interval between the first preset code block and the previous adjacent first preset code block is greater than 128 code blocks, the counter is reset to zero. If the first quantity threshold is preset to 4, when a value of the counter is not less than 4, the client-service-type local fault information starts to be sent. Optionally, a piece of client-service-type local fault information may be sent at intervals of a specific quantity of code blocks. When the value of the counter is less than 4, the client-service-type local fault information is no longer sent.

Further, the client-service-type local fault information generated by the first-type port 2202 is transmitted (or transparently transmitted) to the communications device 2104 along the second-type port 2203, the second-type port 2204, the second-type port 2205, and the second-type port 2206. The communications device needs to transmit, by using the first-type port 2207, the information transmitted by the second-type port 2206. Therefore, when determining that the obtained client-service-type local fault information meets a second preset condition, the communications device 2104 may generate local fault information based on the obtained client-service-type local fault information, and transmit the local fault information to the third-type port 2208 of the communications device 2105 by using the first-type port 2207. Optionally, a fault information processing module of the communications device 2104 may generate the local fault information based on the obtained client-service-type local fault information. Correspondingly, when the obtained client-service-type local fault information does not meet the second preset condition, the communications device 2104 may no longer send the local fault information by using the first-type port 2207. The second preset condition may be: a quantity of third-type fault information obtained within second preset duration is greater than a second quantity threshold; or a quantity of obtained second preset code blocks is not less than the second quantity threshold, and an interval between any two obtained adjacent second preset code blocks does not exceed a second-preset-code-block interval.

Further, after the communications device 2105 obtains the local fault information by using the third-type port 2208, the RS of the third-type port 2208 may deliver remote fault information when it is determined that the obtained local fault information meets the first preset condition. The RS may continuously deliver the remote fault information. Correspondingly, if the communications device 2105 determines that the obtained local fault information does not meet the first preset condition, the communications device 2105 does not deliver the remote fault information any longer.

Further, optionally, after the first-type port 2207 of the communications device 2104 obtains the remote fault information, when determining that the obtained remote fault information meets the first preset condition, the communications device 2104 generates client-service-type remote fault information, and sends the client-service-type remote fault information by using the second-type port 2206. Correspondingly, if the communications device 2105 determines that the obtained remote fault information does not meet the first preset condition, the communications device 2105 does not send the client-service-type remote fault information.

Further, optionally, the client-service-type remote fault information sent by the communications device 2104 by using the second-type port 2206 is transparently transmitted to the communications device 2102 along the second-type port 2205, the second-type port 2204, and the second-type port 2203. The communications device 2102 needs to transmit, by using the first-type port 2202, the information obtained by the second-type port 2203. Therefore, when obtaining the client-service-type remote fault information and determining that the obtained client-service-type remote fault information meets the second preset condition, the communications device 2104 sends the remote fault information by using the first-type port 2202. Correspondingly, if determining that the obtained client-service-type remote fault information does not meet the second preset condition, the communications device does not send the remote fault information by using the first-type port 2202.

Based on the embodiment shown in FIG. 9, this embodiment of this application provides another optional implementation. As shown in FIG. 9, if a link for sending information from the third-type port 2201 of the communications device 2101 to the first-type port 2202 is faulty, a physical layer of the first-type port 2202 generates local fault information. Optionally, when obtaining the first-type fault information by using the first port and determining that the obtained first-type fault information meets the first preset condition, the communications device sends client-service-type local fault information. Correspondingly, if the first-type fault information obtained by the communications device 2102 by using the first-type port 2202 does not meet the first preset condition, fault-rectified information may be sent.

Further, the client-service-type local fault information sent by the first-type port 2202 is transparently transmitted to the communications device 2104 along the second-type port 2203, the second-type port 2204, the second-type port 2205, and the second-type port 2206. The communications device 2104 needs to transmit, by using the first-type port 2207, the information transmitted by the second-type port 2206. Therefore, when determining, based on the obtained client-service-type local fault information, that the obtained client-service-type local fault information meets the second preset condition, the communications device 2104 generates local fault information, and transmits the local fault information to the third-type port 2208 of the communications device 2105 by using the first-type port 2207. Optionally, a fault information processing module of the communications device 2104 may generate the local fault information based on the obtained client-service-type local fault information. Correspondingly, if the communications device 2102 generates fault-rectified information corresponding to the first-type port 2202, the fault-rectified information may also be transparently transmitted to the communications device 2104 along the second-type port 2203, the second-type port 2204, the second-type port 2205, and the second-type port 2206. When determining that the fault-rectified information has been received, the communications device 2104 stops sending the local fault information by using the first-type port 2207.

Further, after the communications device 2105 obtains the local fault information by using the third-type port 2208, the RS of the third-type port 2208 may deliver remote fault information when it is determined that the obtained local fault information meets the first preset condition. The RS may continuously deliver the remote fault information. Correspondingly, if the communications device 2105 determines that the obtained local fault information does not meet the first preset condition, the communications device 2105 does not deliver the remote fault information any longer.

Further, optionally, after the first-type port 2207 of the communications device 2104 receives the remote fault information, when determining that the received remote fault information meets the first preset condition, the communications device 2104 generates client-service-type remote fault information, and sends the client-service-type remote fault information by using the second-type port 2206. Correspondingly, if determining that the received remote fault information does not meet the first preset condition, the communications device 2104 may not send the remote fault information or may send the fault-rectified information.

Further, optionally, the client-service-type remote fault information sent by the communications device 2104 by using the second-type port 2206 is transparently transmitted to the communications device 2102 along the second-type port 2205, the second-type port 2204, and the second-type port 2203. The communications device 2102 needs to transmit, by using the first-type port 2202, the information obtained by the second-type port 2203. Therefore, when receiving the client-service-type remote fault information and determining that the received client-service-type remote fault information meets the second preset condition, the communications device 2104 sends the remote fault information by using the first-type port 2202. Correspondingly, if fault-rectified information corresponding to the first-type port 2207 is generated, the fault-rectified information may also be transparently transmitted to the communications device 2102 along the second-type port 2205, the second-type port 2204, and the second-type port 2203. When determining that the fault-rectified information has been received, the communications device 2102 stops sending the remote fault information or sends the fault-rectified information to the third-type port 2201 of the communications device 2101.

Based on the system architecture shown in FIG. 9, if a protection switching function is configured on the communications device 2104, and a link between second-type ports is faulty, for example, a link for sending information from the second-type port 2205 to the second-type port 2206 is faulty, local fault information is generated at the second-type port 2206 of the communications device 2104, and the communications device 2104 enables a standby link corresponding to the second-type port 2206, for example, enables the second-type port 2301 and the second-type port 2302 in FIG. 9, to connect the communications device 2103 and the communications device 2104. It can be learned that in this embodiment of this application, a fault of a standard Ethernet protocol link can be distinguished from a fault of a flexible Ethernet protocol link; therefore, a fault negotiation mechanism of the standard Ethernet protocol can be reserved, and a self-healing function of the flexible Ethernet protocol can also be implemented based on a protection switching function.

In this embodiment of this application, the standby link corresponding to the second-type port in FIG. 4 may include a link between the second-type port 2301 of the communications device 2103 and the second-type port 2303 of the communications device 2104, or may include a link between a second-type port 3301 of the communications device 2102 and a second-type port 3302 of the communications device 2103, for example, enabling an association relationship between the first-type port 2202 and the second-type port 3301 of the communications device 2102, enabling an association relationship between the second-type port 3302 and the second-type port 2301 of the communications device 2103, and enabling an association relationship between the second-type port 2302 and the first-type port 2207 of the communications device 2104. In other words, the standby link included in the flexible Ethernet protocol may replace all working links within the flexible Ethernet protocol, to ensure the self-healing function inside the flexible Ethernet protocol. For example, in FIG. 4, "a link along the first-type port 2202, the second-type port 3301, the second-type port 3302, the second-type port 2301, the second-type port 2302, and the first-type port 2207" may be used to replace "a link along the first-type port 2202, the second-type port 2203, the second-type port 2204, the second-type port 2205, the second-type port 2206, and the first-type port 2207".

In this embodiment of this application, sending the second-type fault information may be sending at least two pieces of second-type fault information, where any two of the at least two pieces of second-type fault information are separated by at least one code block. Optionally, the sending second fault information based on the first fault information by using a second port includes: sending at least two pieces of second fault information based on the first fault information by using the second port, where any two of the at least two piece of second fault information are separated by at least one code block. In this way, used transmission path bandwidth of a link corresponding to the flexible Ethernet protocol can be reduced.

In this embodiment of this application, FIG. 10 is a schematic diagram of an example of a 0x4B 66-bit block code block according to an embodiment of this application. As shown in FIG. 10, a control block format of a 0x4B code block is $O_0D_1D_2D_3Z_4Z_5Z_6Z_7$, a synchronization header is "10"; a block type field is 0x4B, next 3 bytes are a D1 byte, a D2 byte, and a D3 byte, an O code field comes after the D3 byte, and the last 28 bits are 0xooooooo. The 0x4B code block is a type of control code block defined in FIG. 82-5 in a standard Ethernet IEEE 802.3-2015 standards document.

The fault-rectified information in the foregoing example may be an operation, administration and maintenance (OAM) message block indicating that a client side is normal. The OAM message block may also include mechanisms such as bit error detection, fault detection, delay measurement, and path discovery. The OAM message block of the fault-rectified information may be carried in the 0x4B code block. FIG. 11 is a schematic diagram of an example of fault-rectified information based on the 0x4B code block shown in FIG. 10 according to an embodiment of this application. When the communications device detects the message block shown in FIG. 10, or specifically, when the communications device detects the synchronization header "10", the first byte "0x4B", the first four bits of the fourth byte "0x06", "0b00000101" of the second byte, and "0b00000000" of the third byte, the communications device considers that the fault-rectified information has been received.

FIG. 12 is a schematic diagram of an example of local fault information based on the 0x4B code block shown in FIG. 10 according to an embodiment of this application. FIG. 13 is a schematic diagram of an example of remote fault information based on the 0x4B code block shown in FIG. 10 according to an embodiment of this application. As shown in FIG. 12, in the local fault information, a synchronization header is "10", a block type field is 0x4B, a D1 byte is 0x00, a D2 byte is 0x00, a D3 byte is 0x01, an O code field following the D3 byte is oxo, and the last 28 bits are 0x0000000. As shown in FIG. 13, in the remote fault information, a synchronization header is "10", a block type field is 0x4B, a D1 byte is 0x00, a D2 byte is 0x00, a D3 byte is 0x02, an O code field following the D3 byte is oxo, and the last 28 bits are 0x0000000. It can be seen from FIG. 12 and FIG. 13 that the local fault information and the remote fault information are differentiated by using the D3 byte.

In this embodiment of this application, second-type fault information may be carried in a 0x4B code block. Optionally, the second-type fault information may be an OAM message block. FIG. 14 is a schematic diagram of an example of second-type fault information based on the 0x4B code block shown in FIG. 10 according to an embodiment of this application. As shown in FIG. 14, in the second-type fault information, a 0x4B control type "0x4B" and an O code field "0x6" are carried, and a D1 byte and a D2 byte are used to carry a specific message block. As shown in FIG. 14, the first 6 bits of the D1 byte are used as an OAM message type field. When bit 0 to bit 5 of the D1 byte are "0b000001", it may indicate that the 0x4B code block carries second-type fault information, and in this case, the second-type fault information may be referred to as client service information (CS). The last 2 bits of the D1 byte (bit 6 and bit 7 of the D1 byte) and the first 2 bits of the D2 byte (bit 0 and bit 1 of the D2 byte) are used to indicate CSF, RCSF, and a bearer service (for example, an Ethernet service) information in normal circumstances. For example, if bit 6 and bit 7 of the D1 byte and bit 0 and bit 1 of the D2 byte are "1110", it indicates that the 0x4B code block carries RCSF. For example, if bit 6 and bit 7 of the D1 byte and bit 0 and bit 1 of the D2 byte are "1111", it indicates that the 0x4B code block carries CSF. If bit 6 and bit 7 of the D1 byte and bit 0 and bit 1 of the D2 byte are "oloo", it indicates that the 0x4B code block carries normal service information (for example, Ethernet service information), or may indicate that a fault has been rectified. In other words, if bit 6 and bit 7 of the D1 byte and bit 0 and bit 1 of the D2 byte are "oloo", it may indicate that the 0x4B code block carries fault-rectified information.

FIG. 15 is a schematic diagram of an example of client-service-type local fault information based on the 0x4B code block shown in FIG. 10 according to an embodiment of this application. FIG. 16 is a schematic diagram of an example of client-service-type remote fault information based on the 0x4B code block shown in FIG. 10 according to an embodiment of this application. As shown in FIG. 15, in the client-service-type local fault information, a synchronization header is "10", a block type field is 0x4B, a D1 byte is 0b00000111, a D2 byte is 0b11000000, a D3 byte is 0x06, an O code field following the D3 byte is 0x6, and the last 28 bits are 0x0000000. As shown in FIG. 16, in the client-service-type remote fault information, a synchronization header is "10", a block type field is 0x4B, a D1 byte is 0b00000111, a D2 byte is 0b10000000, a D3 byte is 0x06, an O code field following the D3 byte is 0x6, and the last 28 bits are 0x0000000. It can be seen from FIG. 15 and FIG. 16 that the O code fields of the client-service-type local fault information and the client-service-type remote fault information are 0x6, and the O code fields of the local fault information and the remote fault information shown in FIG. 12 and FIG. 13 are oxo.

Figure 17:
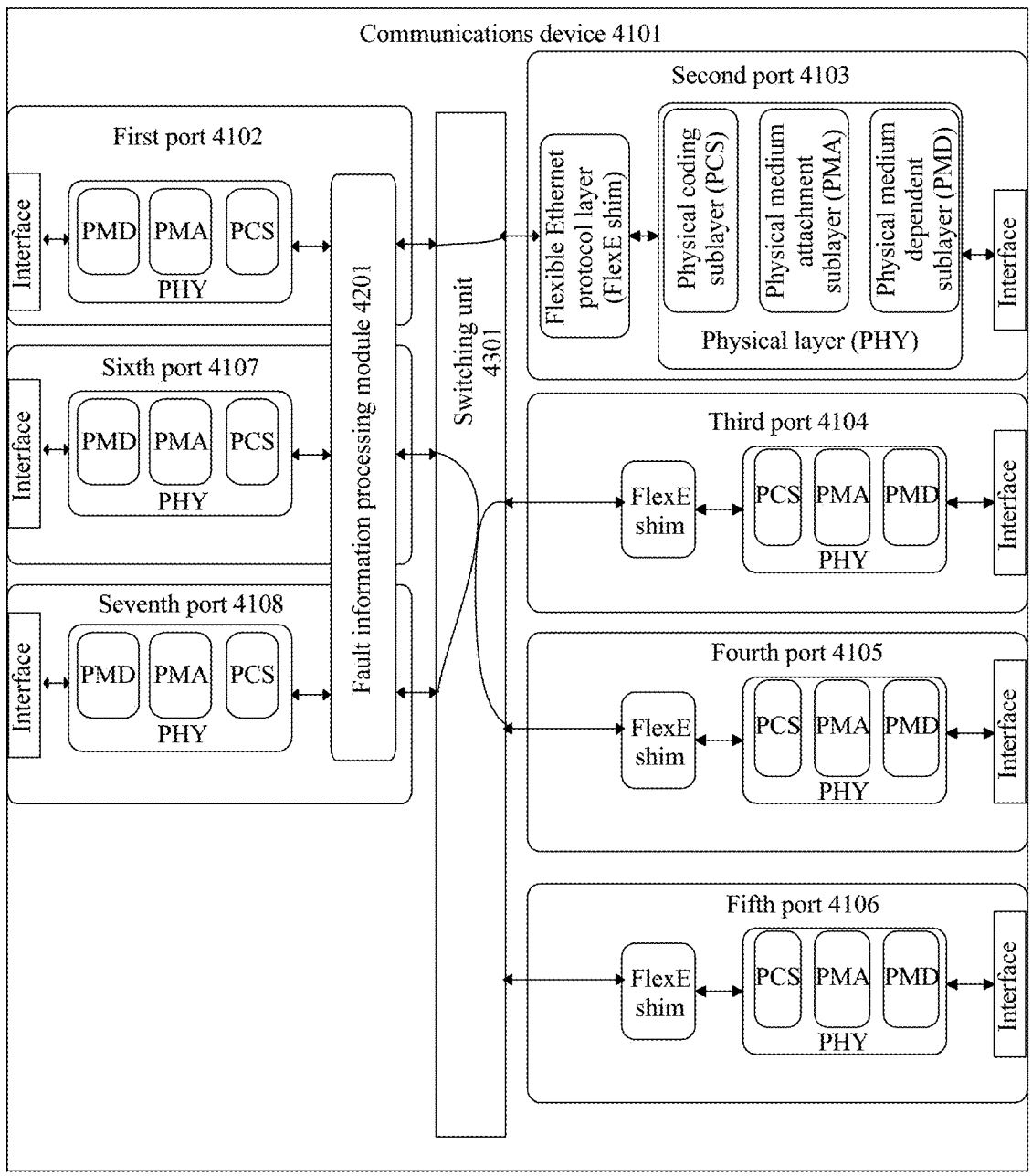
FIG. 17 is a schematic structural diagram of a communications device according to an embodiment of this application.

Based on the foregoing embodiments and a same concept, FIG. 17 is a schematic diagram of a communications device according to an embodiment of this application. As shown in FIG. 17, the communications device 4101 may be a network device, or may be a chip or a circuit, for example, a chip or a circuit that can be disposed on a network device. The communications device can implement the steps performed by the communications device in any one or more corresponding methods shown in FIG. 7 and/or FIG. 8. The communications device 4101 may include a fault information processing module 4201 and at least two ports. For example, the communications device 4101 may include the fault information processing module 4201 and at least one first-type port and at least one second-type port, for example, a first port 4102 and a second port 4103. For another example, the communications device 4101 may include the fault information processing module 4201 and at least two first-type ports, for example, a sixth port 4107 and a seventh port 4108. For another example, the communications device 4101 may include the fault information processing module 4201 and at least two second-type ports, for example, a third port 4104 and a fourth port 4105.

The first port to the seventh port are all schematically shown in FIG. 17. Optionally, two ports of a same type may be a same port. For example, the fourth port 4105 and a fifth port 4106 may be a same port, but for clear description of this embodiment of this application, are depicted as two ports in the figure. For another example, the first port 4102 and the sixth port 4107 may be a same port, but for clear description of this embodiment of this application, are depicted as two ports in the figure. For another example, two ports of different types may also be a same port. For example, the sixth port 4107 and the third port 4104 may be a same port, and the port can support a standard Ethernet protocol and a flexible Ethernet protocol. When the port currently uses the standard Ethernet protocol to send and receive information, the port may be referred to as the sixth port 4107. When the port currently uses the flexible Ethernet protocol to send and receive information, the port may be referred to as the third port 4104. However, for clear description of this embodiment of this application, the port is depicted as two ports in the figure.

Optionally, in FIG. 17, when the communications device 4101 implements the steps performed by the communications device in any one or more corresponding methods shown in FIG. 7, the first port in FIG. 7 may be the first port 4102 of the communications device 4101, and the second port in FIG. 7 may be the second port 4103 of the communications device 4101. Optionally, in FIG. 17, when the communications device 4101 implements the steps performed by the communications device in any one or more corresponding methods shown in FIG. 8, the first port in FIG. 8 may be the first port 4102 of the communications device 4101, and the second port in FIG. 8 may be the second port 4103 of the communications device 4101. Optionally, when the communications device 4101 implements the steps performed by the communications device in any one or more corresponding methods shown in FIG. 7 and FIG. 8, the first ports in FIG. 7 and FIG. 8 may be the first port 4102 of the communications device 4101, and the second ports in FIG. 7 and FIG. 8 may be the second port 4103 of the communications device 4101. In another optional embodiment, when the communications device 4101 implements the steps performed by the communications device in any one or more corresponding methods shown in FIG. 7 and FIG. 8, the first port in FIG. 7 may be the first port 4102 of the communications device 4101, the second port in FIG. 7 may be the second port 4103 of the communications device 4101, the first port in FIG. 8 may be a first-type port of the communications device 4101 other than the first port 4102, and the second port in FIG. 8 may be a second-type port of the communications device 4101 other than the second port 4103.

In this embodiment of this application, the first port 4102, the sixth port 4107, and the seventh port 4108 are first-type ports, and an RS is not configured for the first-type port. The second port 4103, the third port 4104, the fourth port 4105, and the fifth port 4106 are second-type ports, and an RS is not configured for the second-type port. For other related descriptions of the first-type port and the second-type port, refer to the foregoing content. Details are not described herein again.

The fault information processing module 4201 in this embodiment of this application may be a distributed module, and one module is correspondingly disposed for each port. As shown in FIG. 2, the fault information processing modules are integrated into the ports. For example, the fault information processing module 4201 includes the fault information processing module 1601 of the first-type port 1401, the fault information processing module 1602 of the first-type port 1402, and the fault information processing module 1603 of the first-type port 1403 in FIG. 2. Alternatively, the fault information processing module 4201 in this embodiment of this application may be a centralized module, and ports share one fault information processing module. In other words, the fault information processing module 4201 may be an independent module and connected to the ports. The fault information processing module may be disposed on the first-type port side or on the second-type port side. The figure merely shows an example in which the fault information processing module is disposed on the first-type port side. If the fault information processing module 4201 is disposed on the first-type port side, the module may be disposed at an upper layer of a physical layer of each port. If the fault information processing module 4201 is disposed on the second-type port side, the module may be disposed at an upper layer of a physical layer of each port or an upper layer of a flexible Ethernet network protocol layer of each port.

The communications device 4101 in this embodiment of this application further includes a switching unit 4301. Optionally, the switching unit 4301 may be the switching unit 1701 in FIG. 2, is configured to store association relationships between the ports, and may update the association relationships between the ports, and the like. For related descriptions, refer to the foregoing descriptions of the switching unit 1701. Details are not described herein again. Optionally, in the embodiment shown in FIG. 17, there is an association relationship between the first port 4102 and the second port 4103, there is an association relationship between the sixth port 4107 and the seventh port 4108, and there is an association relationship between the third port 4104 and the fourth port 4105. Optionally, the association relationship between the ports may be preconfigured, and the association relationship may be updated, for example, based on a new association relationship entered by a user or a policy of some internal self-healing mechanisms (for example, association relationship update caused by enabling the standby link in the foregoing content).

In a possible design, the first port 4102 in this embodiment of this application is configured to obtain first fault information, for example, received first fault information sent by another port or first fault information generated by a physical layer of the first port 4102. The fault information processing module 4201 is configured to generate second fault information based on the first fault information. The second port 4103 is configured to send the second fault information. The first port 4102 is a first-type port, the first-type port transmits information according to a standard Ethernet protocol, the first fault information is first-type fault information, and the first-type fault information includes at least one of local fault information and remote fault information. The second port 4103 is a second-type port, the second-type port transmits information according to a flexible Ethernet protocol, the second fault information is second-type fault information, and the second-type fault information is used to indicate that a link corresponding to the standard Ethernet protocol is faulty.

In this embodiment of this application, the first fault information is obtained by using the first port, and the second fault information is sent based on the first fault information by using the second port. The first port is a first-type port, the first-type port transmits information according to the standard Ethernet protocol, the first fault information is first-type fault information, the second port is a second-type port, and the second-type port transmits information according to the flexible Ethernet protocol. The first-type fault information includes at least one of the local fault information and the remote fault information, the second fault information is second-type fault information, and the second-type fault information is used to indicate that the link corresponding to the standard Ethernet protocol is faulty. Therefore, through transmission of the second fault information, not only a fault can be reported in joint networking in which the standard Ethernet protocol and the flexible Ethernet protocol are used, but also a foundation can be laid for determining whether a link corresponding to the flexible Ethernet protocol or the link corresponding to the standard Ethernet protocol is faulty.

In a possible design, the fault information processing module 4201 is configured to: if the obtained first-type fault information meets a first preset condition, generate the second fault information based on the first fault information, where the first preset condition includes: a quantity of first-type fault information obtained within first preset duration is greater than a first quantity threshold; or a quantity of obtained first preset code blocks is not less than the first quantity threshold, and an interval between any two obtained adjacent first preset code blocks does not exceed a first-preset-code-block interval. This can avoid a misoperation caused by a relatively small quantity of fault information and further improve operation accuracy.

Based on the foregoing content and a same concept, this embodiment of this application further provides a communications device, and in a possible design, the second port 4103 of the communications device is configured to obtain third fault information, where the third fault information is second-type fault information; the fault information processing module 4201 is further configured to generate fourth fault information based on the third fault information, where the fourth fault information is first-type fault information; and the first port 4102 is further configured to send the fourth fault information. The first port is a first-type port, and the first-type port transmits information according to the standard Ethernet protocol. The second port is a second-type port, and the second-type port transmits information according to the flexible Ethernet protocol. The first-type fault information includes at least one of the local fault information and the remote fault information, and the second-type fault information is used to indicate that the link corresponding to the standard Ethernet protocol is faulty.

In this embodiment of this application, the third fault information is obtained by using the second port, and the fourth fault information is sent based on the third fault information by using the first port. The first-type fault information includes at least one of the local fault information and the remote fault information, and the second-type fault information is used to indicate that the link corresponding to the standard Ethernet protocol is faulty. Therefore, through transmission of the second fault information, first, a fault can be reported in joint networking in which the standard Ethernet protocol and the flexible Ethernet protocol are used, second, a foundation can be laid for determining whether a link corresponding to the flexible Ethernet protocol or the link corresponding to the standard Ethernet protocol is faulty, and third, a solution of reporting a fault on a standard Ethernet protocol network by using the first-type fault information can also be supported.

In a possible design, the fault information processing module 4201 is configured to: if the obtained second-type fault information meets a second preset condition, generate the fourth fault information based on the third fault information, where the second preset condition includes: a quantity of third fault information obtained within second preset duration is greater than a second quantity threshold; or a quantity of obtained second preset code blocks is not less than the second quantity threshold, and an interval between any two obtained adjacent second preset code blocks does not exceed a second-preset-code-block interval. This can avoid a misoperation caused by a relatively small quantity of fault information and further improve operation accuracy.

Based on the foregoing description, there may be other possible implementations used by the communications device 4101 to implement the embodiments of the communication methods shown in FIG. 7 and/or FIG. 8. The following describes other optional implementations used by the communications device 4101 to implement the communication methods shown in FIG. 7 and/or FIG. 8.

In a possible design, the communications device 4101 further includes the third port 4104, configured to obtain fifth fault information, where the third port 4104 is a second-type port, and the fifth fault information is first-type fault information or second-type fault information; and further includes the fourth port 4105, configured to send the fifth fault information, where the fourth port 4105 is a second-type port. In this way, the first-type fault information and the second-type fault information may be transparently transmitted inside a flexible Ethernet network, and further, the second-type fault information may be transmitted inside the flexible Ethernet network, and the first-type fault information may be transmitted outside the flexible Ethernet network, so that whether a link corresponding to the flexible Ethernet protocol or the link corresponding to the standard Ethernet protocol is faulty can be determined based on a type of fault information.

In a possible design, the communications device 4101 further includes the fifth port 4106, configured to: obtain sixth fault information, where the fifth port 4106 is a second-type port, the sixth fault information is first-type fault information, and a standby link is configured for the fifth port 4106; and enable the standby link corresponding to the fifth port 4106. It can be learned that in this embodiment of this application, whether a link corresponding to the flexible Ethernet protocol or the link corresponding to the standard Ethernet protocol is faulty can be determined based on the first-type fault information and the second-type fault information. This prevents a protection switching function from being triggered when the link corresponding to the standard Ethernet protocol is faulty, and can more accurately trigger the protection switching function based on fault information on the flexible Ethernet protocol network.

In a possible design, the second port 4103 is configured to send at least two pieces of second fault information, where any two of the at least two pieces of second fault information are separated by at least one code block. In this way, sending frequency of the second fault information can be flexibly set. For example, if the sending frequency of the second fault information is set to be smaller than sending frequency of the first fault information, used transmission path bandwidth of a link corresponding to the flexible Ethernet protocol can be reduced. For example, the first fault information is the remote fault information, and the second fault information is client-service-type remote fault information. The remote fault information is continuously sent, and relatively large bandwidth is occupied. If a piece of client-service-type remote fault information is sent at intervals of a specific quantity of code blocks, occupied bandwidth can be reduced.

It should be noted that the unit division in this embodiment of this application is an example, and is merely logical function division, or may be other division in actual implementation. Functional units in this embodiment of this application may be integrated into one processing unit, or each of the units may exist alone physically, or two or more units may be integrated into one unit. The integrated unit may be implemented in a form of hardware, or may be implemented in a form of a software functional unit.

Figure 18:
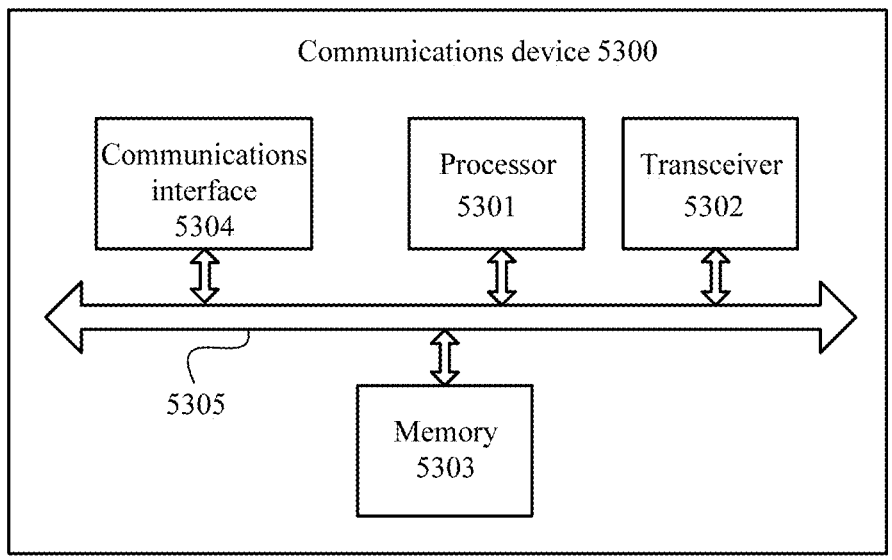
FIG. 18 is a schematic structural diagram of another communications device according to an embodiment of this application.

Based on the foregoing embodiments and a same concept, FIG. 18 is a schematic diagram of a communications device according to an embodiment of this application. As shown in FIG. 18, the communications device 5300 may be a network device, or may be a chip or a circuit, for example, a chip or a circuit that can be disposed on a network device. The communications device can implement the steps performed by the communications device in any one or more corresponding methods shown in FIG. 7 and/or FIG. 8. The communications device 5300 may include a processor 5301, a transceiver 5302, a memory 5303, and a communications interface 5304. The processor 5301, the transceiver 5302, the memory 5303, and the communications interface 5304 are connected to each other by using a bus 5305.

The bus 5305 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The memory 5303 may include a volatile memory, for example, a random-access memory (RAM); or the memory may include a nonvolatile memory, for example, a flash memory, a hard disk drive (HDD), or a solid-state drive (SSD); or the memory 5303 may include a combination of the memories of the foregoing types.

The communications interface 5304 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface. The communications interface 5304 may be the foregoing ports, for example, the first-type port and the second-type port, and for another example, the first port 4102, the second port 4103, the third port 4104, the fourth port 4105, the fifth port 4106, the sixth port 4107, and the seventh port 4108 in FIG. 17.

The processor 5301 may be a central processing unit (CPU), a network processor (NP), or a combination of a CPU and an NP. The processor 5301 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 5303 may be further configured to store a program instruction. By invoking the program instruction stored in the memory 5303, the processor 5301 can control the transceiver 5302 to send and receive signals, and can execute one or more steps of the embodiments shown in the foregoing solution or an optional implementation thereof, so that the communications device 5300 implements the functions of the communications device in the foregoing method.

In this embodiment of this application, the processor is configured to: obtain first fault information by using a first port, and control, based on the first fault information, the transceiver to send second fault information by using a second port. The transceiver is configured to send the second fault information by using the second port. The first port is a first-type port, the first-type port transmits information according to a standard Ethernet protocol, the first fault information is first-type fault information, and the first-type fault information includes at least one of local fault information and remote fault information. The second port is a second-type port, the second-type port transmits information according to a flexible Ethernet protocol, the second fault information is second-type fault information, and the second-type fault information is used to indicate that a link corresponding to the standard Ethernet protocol is faulty.

In this embodiment of this application, the first fault information is obtained by using the first port, and the second fault information is sent based on the first fault information by using the second port. The first port is a first-type port, the first-type port transmits information according to the standard Ethernet protocol, the first fault information is first-type fault information, the second port is a second-type port, and the second-type port transmits information according to the flexible Ethernet protocol. The first-type fault information includes at least one of the local fault information and the remote fault information, the second fault information is second-type fault information, and the second-type fault information is used to indicate that the link corresponding to the standard Ethernet protocol is faulty. Therefore, through transmission of the second fault information, not only a fault can be reported in joint networking in which the standard Ethernet protocol and the flexible Ethernet protocol are used, but also a foundation can be laid for determining whether a link corresponding to the flexible Ethernet protocol or the link corresponding to the standard Ethernet protocol is faulty.

In a possible design, the processor is configured to: if the obtained first-type fault information meets a first preset condition, control, based on the first fault information, the transceiver to send the second fault information by using the second port, where the first preset condition includes: a quantity of first-type fault information obtained within first preset duration is greater than a first quantity threshold; or a quantity of obtained first preset code blocks is not less than the first quantity threshold, and an interval between any two obtained adjacent first preset code blocks does not exceed a first-preset-code-block interval.

Based on the foregoing content and a same concept, this embodiment of this application further provides a communications device, and in a possible design, the processor of the communications device is further configured to: obtain third fault information by using the second port, where the third fault information is second-type fault information; and control, based on the third fault information, the transceiver to send fourth fault information by using the first port, where the fourth fault information is first-type fault information. The first port is a first-type port, and the first-type port transmits information according to the standard Ethernet protocol. The second port is a second-type port, and the second-type port transmits information according to the flexible Ethernet protocol. The first-type fault information includes at least one of the local fault information and the remote fault information, and the second-type fault information is used to indicate that the link corresponding to the standard Ethernet protocol is faulty.

In this embodiment of this application, the third fault information is obtained by using the second port, and the fourth fault information is sent based on the third fault information by using the first port. The first-type fault information includes at least one of the local fault information and the remote fault information, and the second-type fault information is used to indicate that the link corresponding to the standard Ethernet protocol is faulty. Therefore, through transmission of the second fault information, first, a fault can be reported in joint networking in which the standard Ethernet protocol and the flexible Ethernet protocol are used, second, a foundation can be laid for determining whether a link corresponding to the flexible Ethernet protocol or the link corresponding to the standard Ethernet protocol is faulty, and third, a solution of reporting a fault on a standard Ethernet protocol network by using the first-type fault information can also be supported.

In a possible design, the processor is configured to: if the obtained second-type fault information meets a second preset condition, control, based on the third fault information, the transceiver to send the fourth fault information by using the first port, where the second preset condition includes: a quantity of third fault information obtained within second preset duration is greater than a second quantity threshold; or a quantity of obtained second preset code blocks is not less than the second quantity threshold, and an interval between any two obtained adjacent second preset code blocks does not exceed a second-preset-code-block interval.

Based on the foregoing description, there may be other possible implementations used by the communications device 5300 to implement the embodiments of the communication methods shown in FIG. 7 and/or FIG. 8. The following describes other optional implementations used by the communications device 5300 to implement the communication methods shown in FIG. 7 and/or FIG. 8.

In a possible design, the processor is further configured to obtain fifth fault information by using a third port, where the third port is a second-type port, and the fifth fault information is first-type fault information or second-type fault information; and the transceiver is further configured to send the fifth fault information by using a fourth port, where the fourth port is a second-type port.

In a possible design, the processor is further configured to: obtain sixth fault information by using a fifth port, where the fifth port is a second-type port, the sixth fault information is first-type fault information, and a standby link is configured for the fifth port; and enable the standby link corresponding to the fifth port.

In a possible design, the processor is configured to control, based on the first fault information, the transceiver to send at least two pieces of second fault information by using the second port, where any two of the at least two piece of second fault information are separated by at least one code block.

Figure 19:
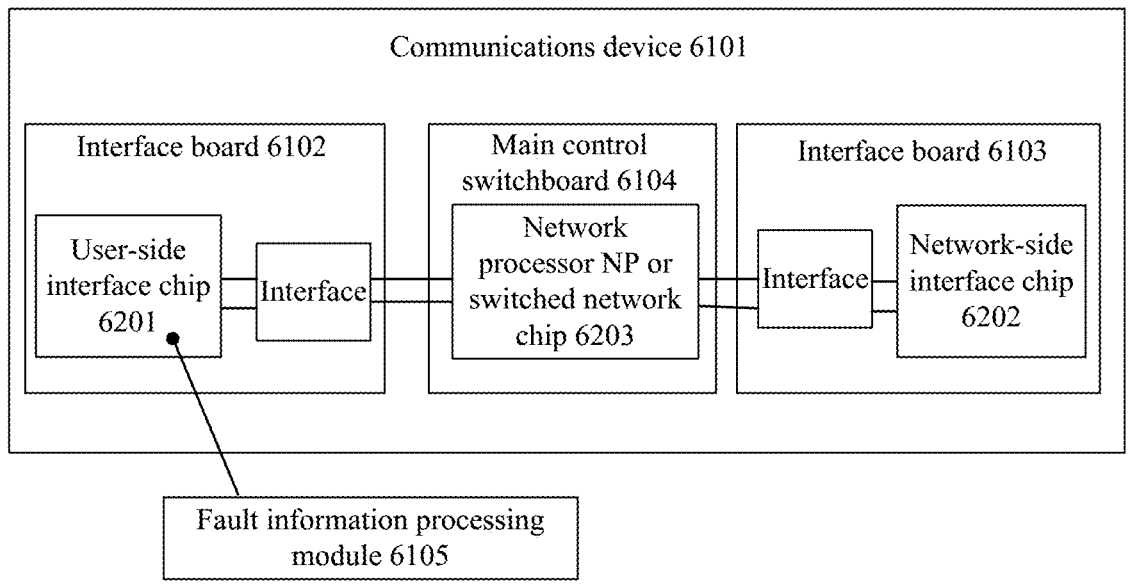
FIG. 19 is a schematic structural diagram of another communications device according to an embodiment of this application.

Based on the foregoing embodiments and a same concept, FIG. 19 is a schematic diagram of a communications device according to an embodiment of this application. As shown in FIG. 19, the communications device 6101 may be a communications device in the foregoing content, for example, the communications device 5300 in FIG. 18, the communications device 4101 in FIG. 17, the communications device 1301 in FIG. 2 and FIG. 3, or the communications devices in FIG. 2 to FIG. 6, and FIG. 9, such as the communications device 2102 and the communications device 2104. The communications device 6101 may also be referred to as a packet bearer device. During specific implementation, the communications device 6101 provided in this embodiment of this application may be implemented as a network device supporting layer 1.5 switching. A product form of the communications device (or referred to as the network device) includes a box- or frame-shaped switch device that includes a port supporting a flexible Ethernet protocol and that is based on an Internet Protocol radio access network (IPRAN) or a packet transport network (PTN). In this embodiment of this application, a solution for a to-be-implemented product may be implemented by adding an FPGA between a chip of an existing second-type port (also referred to as a FlexE port) and a PHY chip of a standard Ethernet protocol port, for example, the added FPGA implements the solution executed by the foregoing fault information processing module; or may be implemented in a chip of a second-type port (also referred to as a FlexE port), for example, the solution executed by the foregoing fault information processing module is implemented in the chip, so as to insert and extract a CSF message block and/or an RCSF message block and an LF message block and/or an RF message block into and from a 66-bit block data flow.

As shown in FIG. 19, the communications device 6101 may include a main control switching board 6104, an interface board 6102, and an interface board 6103. The main control switching board 6104 may be a switching unit in the foregoing content, for example, the switching unit 4301 in FIG. 17 or the switching unit 1701 in FIG. 2. The switching unit or the main control switching board is not shown in other figures, but ports are connected by using the main control switching board or the switching unit. The main control switching board 6104 includes a network processor (NP) or a switched network chip 6203. The network processor (NP) or the switched network chip 6203 may be a part of the processor 5301 in FIG. 18.

As shown in FIG. 19, the interface board 6102 may be a user-side interface board, and may include a user-side interface chip 6201. The user-side interface chip 6201 may be a first-type port, for example, the first port 4102 in FIG. 17 or the first-type port 2202 in FIG. 9. The user-side interface chip 6201 is connected to the main control switching board 6104 by using an interface.

In this embodiment of this application, a fault information processing module 6105 may be integrated into the user-side interface chip 6201. The fault information processing module 6105 may be a distributed module, for example, one fault information processing module is integrated into each user-side interface chip, or may be a centralized module, for example, one fault information processing module is shared by a plurality of user-side interface chips. The fault information processing module 6105 may be the fault information processing module 4201 in FIG. 17, or may be at least one of the fault information processing module 1601, the fault information processing module 1602, and the fault information processing module 1603 in FIG. 2.

As shown in FIG. 19, the interface board 6103 may be a network-side interface board, and may include a network-side interface chip 6202. The network-side interface chip 6202 may be a second-type port, for example, the second port 4103 in FIG. 17 or the second type port 2205 in FIG. 9. The network-side interface chip 6202 is connected to the main control switching board 6104 by using an interface.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should also be understood that the numbers such as "first", "second", "third", and "fourth" used in this specification are merely for distinguishing purposes for ease of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that in combination with illustrative logical blocks described in the embodiments disclosed in this specification and steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions based on the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining first fault information using a first port, wherein the first port is a first-type port, the first-type port transmits information according to a standard Ethernet protocol, the first fault information is first-type fault information, and the first-type fault information comprises local fault information or remote fault information; and
    sending second fault information based on the first fault information using a second port, wherein the second port is a second-type port, the second-type port transmits information according to a flexible Ethernet protocol, the second fault information is second-type fault information, the second-type fault information indicates that a link corresponding to the standard Ethernet protocol is faulty, and the second fault information is carried in an operation, administration and maintenance (OAM) message block.

2. The method according to claim 1, wherein sending the second fault information based on the first fault information using the second port comprises:
    when the first-type fault information meets a first preset condition, sending the second fault information based on the first fault information using the second port, wherein the first preset condition comprises:
        a quantity of pieces of first-type fault information obtained within a first preset duration is greater than a first quantity threshold; or
        a quantity of obtained first preset code blocks is greater than or equal to the first quantity threshold, and an interval between any two obtained adjacent first preset code blocks is less than or equal to a first-preset-code-block interval.

3. The method according to claim 2, further comprising:
    obtaining third fault information using the second port, wherein the third fault information is second-type fault information; and
    sending fourth fault information based on the third fault information using the first port, wherein the fourth fault information is first-type fault information.

4. The method according to claim 3, further comprising:
    obtaining fifth fault information using a third port, wherein the third port is a second-type port, and the fifth fault information is first-type fault information or second-type fault information; and
    sending the fifth fault information using a fourth port, wherein the fourth port is a second-type port.

5. The method according to claim 3, wherein sending the fourth fault information based on the third fault information using the first port comprises:
    when the second-type fault information meets a second preset condition, sending the fourth fault information based on the third fault information using the first port, wherein the second preset condition comprises:
        a quantity of pieces of third fault information obtained within a second preset duration is greater than a second quantity threshold; or
        a quantity of obtained second preset code blocks is greater than or equal to the second quantity threshold, and an interval between any two obtained adjacent second preset code blocks is less than or equal to a second-preset-code-block interval.

6. The method according to claim 1, further comprising:
    obtaining sixth fault information using a fifth port, wherein the fifth port is a second-type port, the sixth fault information is first-type fault information, and a standby link is configured for the fifth port; and
    enabling the standby link configured for the fifth port.

7. The method according to claim 1, wherein sending the second fault information based on the first fault information using the second port comprises:
    sending at least two pieces of second fault information based on the first fault information using the second port, wherein any two pieces of second fault information of the at least two pieces of second fault information are separated by at least one code block.

8. The method according to claim 1, wherein the OAM message block that carries the second fault information includes a block type field $0x_4B$.

9. A device, comprising:
a processor; and
a transceiver;
wherein the processor is configured to:
obtain first fault information using a first port; and
control, based on the first fault information, the transceiver to send second fault information using a second port;
wherein the transceiver is configured to send the second fault information using the second port; and
wherein the first port is a first-type port, the first-type port transmits information according to a standard Ethernet protocol, the first fault information is first-type fault information, the first-type fault information comprises local fault information or remote fault information, the second port is a second-type port, the second-type port transmits information according to a flexible Ethernet protocol, the second fault information is second-type fault information, the second-type fault information indicates that a link corresponding to the standard Ethernet protocol is faulty, and the second fault information is carried in an operation, administration and maintenance (OAM) message block.

10. The device according to claim 9, wherein the processor is configured to:
when the first-type fault information meets a first preset condition, control, based on the first fault information, the transceiver to send the second fault information using the second port, wherein the first preset condition comprises:
a quantity of pieces of the first-type fault information obtained within a first preset duration is greater than a first quantity threshold; or
a quantity of obtained first preset code blocks is greater than or equal to the first quantity threshold, and an interval between any two obtained adjacent first preset code blocks is less than or equal to a first-preset-code-block interval.

11. The device according to claim 10, wherein the processor is further configured to:
obtain third fault information using the second port, wherein the third fault information is second-type fault information; and
control, based on the third fault information, the transceiver to send fourth fault information using the first port, wherein the fourth fault information is first-type fault information.

12. The device according to claim 11, wherein the processor is configured to:
when the second-type fault information meets a second preset condition, control, based on the third fault information, the transceiver to send the fourth fault information using the first port, wherein the second preset condition comprises:
a quantity of pieces of third fault information obtained within a second preset duration is greater than a second quantity threshold; or
a quantity of obtained second preset code blocks is greater than or equal to the second quantity threshold, and an interval between any two obtained adjacent second preset code blocks is less than or equal to a second-preset-code-block interval.

13. The device according to claim 11, wherein the processor is further configured to:
obtain fifth fault information using a third port, wherein the third port is a second-type port, and the fifth fault information is first-type fault information or second-type fault information; and
the transceiver is further configured to:
send the fifth fault information using a fourth port, wherein the fourth port is a second-type port.

14. The device according to claim 9, wherein the processor is further configured to:
obtain sixth fault information using a fifth port, wherein the fifth port is a second-type port, the sixth fault information is first-type fault information, and a standby link is configured for the fifth port; and
enable the standby link configured for the fifth port.

15. The device according to claim 9, wherein the processor is configured to:
control, based on the first fault information, the transceiver to send at least two pieces of second fault information using the second port, wherein any two pieces of second fault information of the at least two pieces of second fault information are separated by at least one code block.

16. The device according to claim 9, wherein the OAM message block that carries the second fault information includes a block type field $0x_4B$.

17. A device, comprising:
a non-transitory memory, configured to store a program instruction;
a communications interface, configured to receive and send data; and
a processor, configured to invoke the program instruction stored in the non-transitory memory to perform:
obtain first fault information using a first port, wherein the first port is a first-type port, the first-type port transmits information according to a standard Ethernet protocol, the first fault information is first-type fault information, and the first-type fault information comprises local fault information or remote fault information; and
send second fault information based on the first fault information using a second port, wherein the second port is a second-type port, the second-type port transmits information according to a flexible Ethernet protocol, the second fault information is second-type fault information, the second-type fault information indicates that a link corresponding to the standard Ethernet protocol is faulty, and the second fault information is carried in an operation, administration and maintenance (OAM) message block.

18. The device according to claim 17, wherein the processor being configured to send the second fault information based on the first fault information using the second port comprises the processor being configured to:
when the first-type fault information meets a first preset condition, send the second fault information based on the first fault information using the second port, wherein the first preset condition comprises:
a quantity of pieces of first-type fault information obtained within a first preset duration is greater than a first quantity threshold; or
a quantity of obtained first preset code blocks is greater than or equal to the first quantity threshold, and an interval between any two obtained adjacent first preset code blocks is less than or equal to a first-preset-code-block interval.

19. The device according to claim 18, wherein the processor is configured to:
  obtain third fault information using the second port, wherein the third fault information is second-type fault information; and
  send fourth fault information based on the third fault information using the first port, wherein the fourth fault information is first-type fault information.

20. The device according to claim 17, wherein the OAM message block that carries the second fault information includes a block type field $0x_4B$.

* * * * *